US012188344B2

(12) United States Patent
Li et al.

(10) Patent No.: US 12,188,344 B2
(45) Date of Patent: *Jan. 7, 2025

(54) CHARGING AND COMMUNICATION INTERFACE FOR DRILL BIT NOZZLE-BASED SENSING SYSTEM

(71) Applicant: SAUDI ARABIAN OIL COMPANY, Dhahran (SA)

(72) Inventors: Bodong Li, Dhahran (SA); Abrar Alshaikh, Saihat (SA); Chinthaka Pasan Gooneratne, Dhahran (SA); Guodong Zhan, Dhahran (SA); Timothy Eric Moellendick, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 114 days.

This patent is subject to a terminal disclaimer.

(21) Appl. No.: 17/809,708

(22) Filed: Jun. 29, 2022

(65) Prior Publication Data

US 2022/0325615 A1 Oct. 13, 2022

Related U.S. Application Data

(62) Division of application No. 17/208,333, filed on Mar. 22, 2021, now Pat. No. 11,414,980.

(51) Int. Cl.
*E21B 47/013* (2012.01)
*E21B 10/60* (2006.01)
(Continued)

(52) U.S. Cl.
CPC ........... *E21B 47/013* (2020.05); *H01F 38/14* (2013.01); *E21B 10/60* (2013.01); *G08C 17/02* (2013.01)

(58) Field of Classification Search
CPC ........ E21B 47/013; E21B 10/60; H01F 38/14; G08C 17/02
See application file for complete search history.

(56) References Cited

U.S. PATENT DOCUMENTS 10,386,318 B2 8/2019 Hay et al.
11,414,980 B1 * 8/2022 Li ......................... E21B 47/013
(Continued)

FOREIGN PATENT DOCUMENTS

EP 0728915 A2 8/1996

OTHER PUBLICATIONS

International Search Report and Written Opinion issued in corresponding International Patent Application No. PCT/US2022/021374, mailed on Jul. 25, 2022 (19 pages).

*Primary Examiner* — Quan Zhen Wang
*Assistant Examiner* — Mancil Littlejohn, Jr.
(74) *Attorney, Agent, or Firm* — Osha Bergman Watanabe & Burton LLP

(57) ABSTRACT

A method includes utilizing a charging and communication interface and a sensor system to gather downhole measurements. The method further includes charging and activating the sensor system using the charging and communication interface, installing the sensor system into a nozzle of a drill bit, running the drill bit into a wellbore, conducting measurements using the sensor system, pulling the drill bit out of the wellbore, and contacting the charging and communication interface with the sensor system to retrieve the measurements from the sensor system.

8 Claims, 13 Drawing Sheets

(51) Int. Cl.
*G08C 17/02* (2006.01)
*H01F 38/14* (2006.01)

(56) References Cited

U.S. PATENT DOCUMENTS

| | | | | |
|---|---|---|---|---|
| 2007/0194946 | A1* | 8/2007 | Hall | G01V 11/002 340/853.1 |
| 2012/0024600 | A1 | 2/2012 | Bittar et al. | |
| 2013/0200140 | A1* | 8/2013 | Kawabata | A61B 5/14532 235/375 |
| 2017/0321536 | A1 | 11/2017 | Hay | |

* cited by examiner

CHARGING AND COMMUNICATION INTERFACE FOR DRILL BIT NOZZLE-BASED SENSING SYSTEM

BACKGROUND

Hydrocarbon fluids are often found in hydrocarbon reservoirs located in porous rock formations below the earth's surface. Hydrocarbon wells may be drilled to extract the hydrocarbon fluids from the hydrocarbon reservoirs. Hydrocarbon wells may be drilled by running a drill string, comprised of a drill bit and a bottom hole assembly, into a wellbore to break the rock and extend the depth of the wellbore. A fluid may be pumped through a nozzle of the drill bit to help cool and lubricate the drill bit, provide bottom hole pressure, and carry cuttings to the surface. Drill bits conventionally have a plurality of nozzles. The nozzle is the part of the drill bit that is a hole or opening which allows for drilling fluid to exit the drill string into the wellbore. The nozzle's opening is small in order for the exit velocity of the drilling fluid to be high. The high-velocity jet of fluid cleans the teeth of the drill bit and aids in the removal of cuttings from the bottom of the wellbore.

During drilling operations, downhole equipment such as the drill bit, bottom hole assembly, and drill string encounter harsh conditions which may include high temperatures, hard formations, and high pressures. These conditions cause damage to the downhole equipment. Damage causes the drill bit to become under gauge and may lower rate of penetration (ROP). Severe damage may cause the drill string or bottom hole assembly to be twisted off and left in the wellbore. Changing various drilling parameters such as mud weight, weight on bit, and fluid velocity in response to the conditions experienced in the wellbore may reduce equipment damage.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, an apparatus and a method of use for an apparatus to interact with a sensor system. In general, and in one embodiment, the apparatus is designed to interact with a sensor system and may include a stationary platform having an upper surface, at least one slot extending a depth from the upper surface into the stationary platform, and an electrical conductor connected to the at least one slot, wherein the electrical conductor is connected to at least one power supply and at least one computing device.

In another aspect, embodiments of the present disclosure may relate to a device for interaction with a sensor system that includes a portable linear body having a pin end, an electrical conductor connected to the pin end, the electrical conductor comprising at least one coil, at least one power supply, and at least one computing device in communication with the electrical conductor.

In further embodiments, a method for utilizing the apparatus for interaction with a sensor system may include charging and activating the sensor system using a charging and communication interface, installing the sensor system into a nozzle of a drill bit, running the drill bit into a wellbore, conducting measurements using the sensor system, pulling the drill bit out of the wellbore, and contacting the charging and communication interface with the sensor system to retrieve the measurements from the sensor system.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
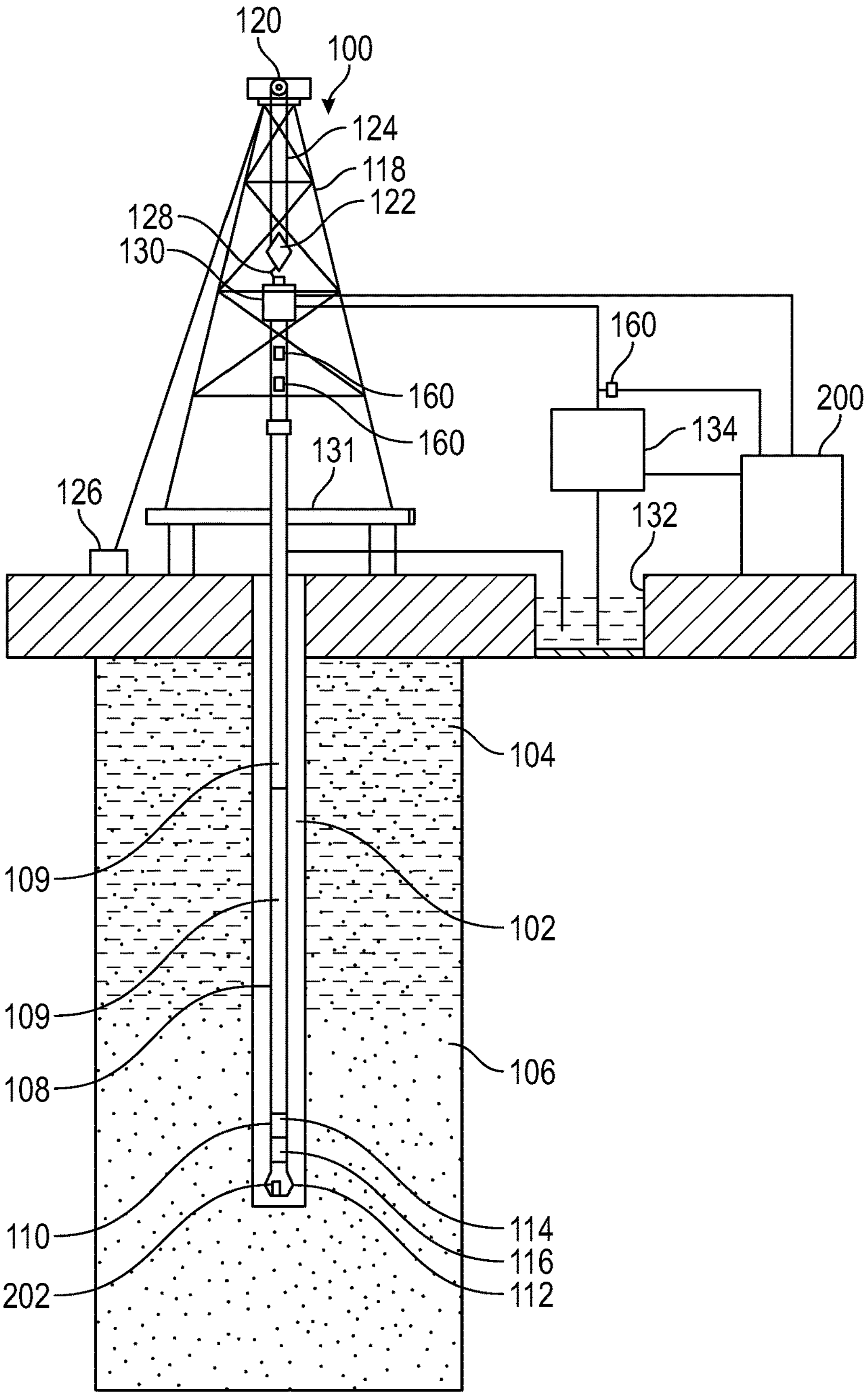
FIG. 1 is a schematic diagram of an exemplary well site in accordance with one or more embodiments.

FIG. 1 illustrates an exemplary well site (100). In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that can be used to adjust the length of the cable (124) so that the traveling block (122) may move up or down the derrick (118). The traveling block (122) may include a hook (128) on which a top drive (130) is supported. The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (200) may be disposed at or communicate with the well site (100). System (200) may control at least a portion of a drilling operation at the well site (100) by providing controls to various components of the drilling operation. In one or more embodiments, system (200) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation). Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a downhole drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108). The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (200).

One or more sensor systems (202) according to embodiments disclosed herein may be fitted into nozzle receptacles in the drill bit (112), which may collect downhole data in addition to or alternatively to data collected by sensors (160). In some embodiments, sensor systems (202) according to embodiments disclosed herein may be used to collect downhole data that other sensors (160) would otherwise not be able to collect, e.g., downhole data related to conditions at the drill bit (112), such as temperature at the bit, bit vibration, and drilling fluid exit flow rate. Downhole data collected from the sensor system (202) may be sent to or collected by the system (200), which may interpret and analyze the downhole data.

Figure 2:
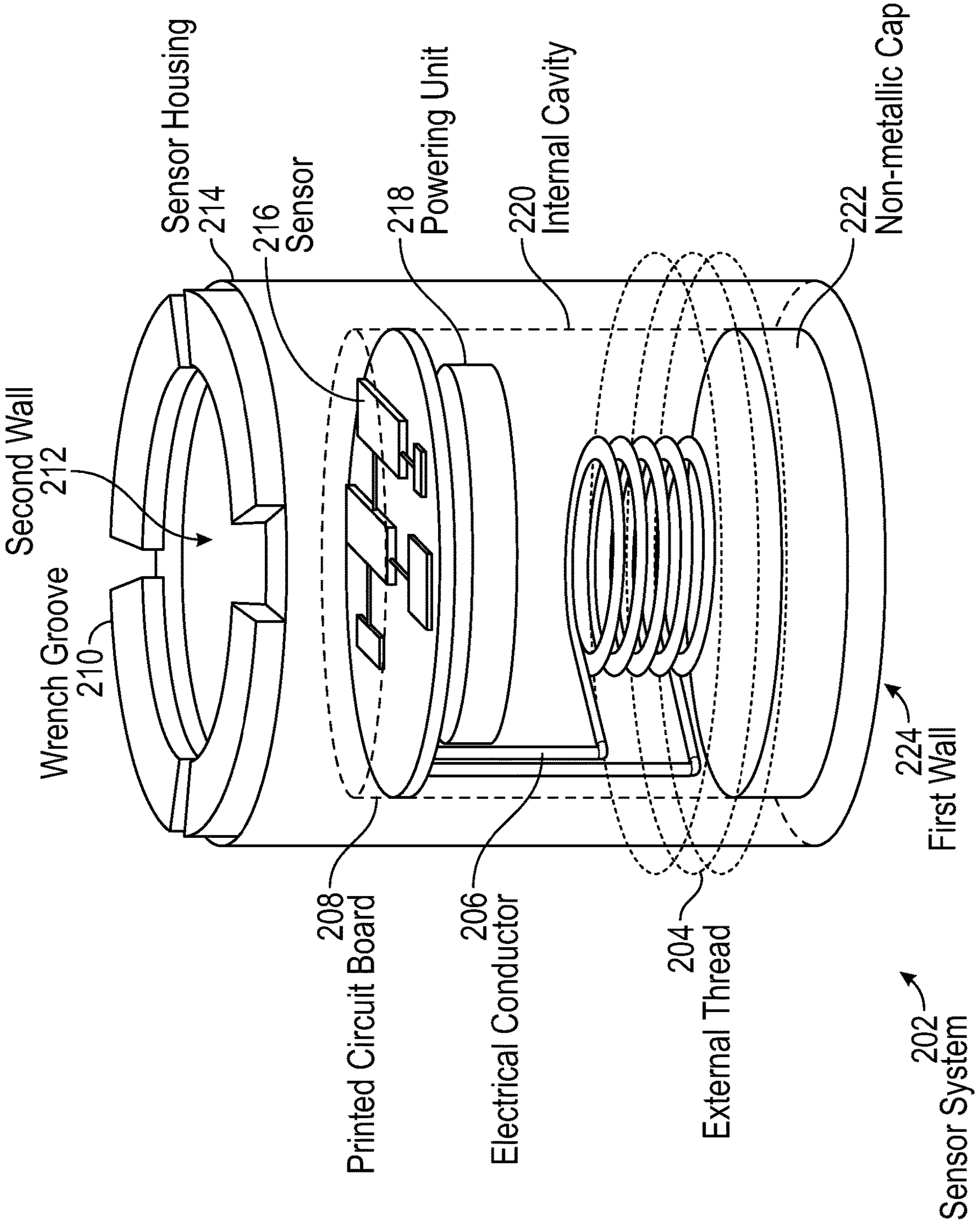
FIG. 2 is a schematic diagram of a sensor system in accordance with one or more embodiments.

FIG. 2 depicts, in one or more embodiments, a sensor system (202) that may be installed in a drill bit (112) to be deployed in a wellbore (102) by a drill string (108) to gather downhole drilling conditions. The sensor system (202) may include a sensor housing (214), at least one sensor (216), an internal cavity (220), a non-metallic cap (222), an electrical conductor (206), a powering unit (218), and a printed circuit board (PCB) (208). The sensor housing (214) may include a first wall (224) at a first axial end of the sensor housing (214) and a second wall (212) at a second axial end of the sensor housing (214). The first wall (224) and the second wall (212) may seal the sensor housing (214) from fluid flowing there through.

The sensor housing (214) may be made of any material, such as a hard chrome and copper material, a resin, or any other polymer material that has a relatively high resistance to high temperatures and erosion and can resist the abrasive and corrosive impact of the jetted drilling fluid. The sensor housing (214) may have a generally cylindrical shape, which may correspond in shape with and fit within a nozzle receptacle formed in a drill bit (112), wherein the drill bit (112) nozzle receptacle is a corresponding cylindrical cavity located on the surface of the drill bit (112). The sensor housing (214) may also have a wrench groove (210) on one external end of the sensor housing (214). The wrench groove (210) may allow for installation and removal of the sensor housing (214) into and from a drill bit (112) nozzle receptacle. At least one external thread (204) may be wrapped around the sensor housing (214) and at least one internal thread may be formed around an internal surface of the nozzle receptacle. The external thread (204) of the sensor housing (214) may correspond to the internal thread of the nozzle receptacle, such that the sensor housing (214) may be threaded into and out of the nozzle receptacle by the internal thread and the external thread (204).

The internal cavity (220) is a void located within the sensor housing (214). The internal cavity (220) may or may not be pressure sealed. The internal cavity (220) may house the PCB (208), sensor(s) (216), electrical conductor (206), and powering unit (218). The components within the internal cavity (220) may be surrounded by or coated with a resin or polymer material to fully protect the components from downhole conditions. A non-metallic cap (222) may seal one or both ends of the internal cavity (220). The non-metallic cap (222) may allow for wireless power transmission and data communication. The non-metallic cap (222) may be non-metallic and non-conductive in order for the wireless power transmission and data communication to be efficient, as electromagnetic waves attenuate significantly/lose their power as they pass though metallic/conductive materials. The PCB (208) may mechanically support and electrically connect the electrical and electronic components of the sensor system (202) using conductive tracks, pads, and other features, for example. The PCB (208) may be single sided, dual sided, or multi-layered. The outer layers may be made of an insulating material with a layer of copper foil laminated to the insulating material, for example. The inner layers of the of the multi-layered PCB (208) may alternate copper and insulating layers. The surface of the PCB (208) may have a coating that protects the cooper from corrosion and reduces the chances of electrical shorts.

The sensors (216) may be pressure sensors, accelerometers, gyroscopic sensors, magnetometer sensors, and temperature sensors, however, any sensor (216) may be used without departing from the scope of the disclosure herein. The sensors (216) may gather data about the drill bit (112) and downhole conditions during the drilling operation. The data may be stored on the PCB (208) and/or sent to the surface in real time using measurement while drilling (MWD) technology, electromagnetic measurement while drilling (EMWD) technology, acoustic-based MWD technology, wired drillpipe, logging while drilling (LWD) technology, or mud pulser telemetry, however any method of sending downhole data to the surface may be used without departing from the scope of this disclosure herein.

The powering unit (218) may store and convert energy supplied by a charging and communication interface. For example, the powering unit (218) may be a rechargeable battery. The electrical conductor (206) may be a coil, an antenna, or a contact pad. The coil may be a single coil, multiple coils, or a combined coil. The antenna may be a PCB (208) based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (206) of the sensor system (202) may be positioned within the sensor housing (214) in a location that corresponds with a location in a charging and communication interface, when the sensor system (202) interfaces with the charging and communication interface, the electrical conductor (206) may interface with or be positioned proximate with an electrical conductor of the charging and communication interface. In the embodiment shown, the electrical conductor (206) may be a coil positioned proximate the non-metallic cap (222) at an axial end of the sensor housing (214), where a charging and communication interface may be positioned proximate the non-metallic cap (222) to wirelessly charge the powering unit (218) and/or communicate with the PCB (208) (e.g., to download sensor (216) data or upload software instructions). The wireless charging may be achieved by inductive coupling or magnetic resonance coupling. The communication may be achieved by using high frequency Bluetooth technology.

The sensor(s) (216) may be attached to the PCB (208) and in communication with electrical components of the PCB (208). The electrical conductor (206) may also be connected to and in communication with the PCB (208). The powering unit (218) may be electrically connected to the PCB (208) to provide power to the connected electrical components in the sensor system (202).

Figure 3B:
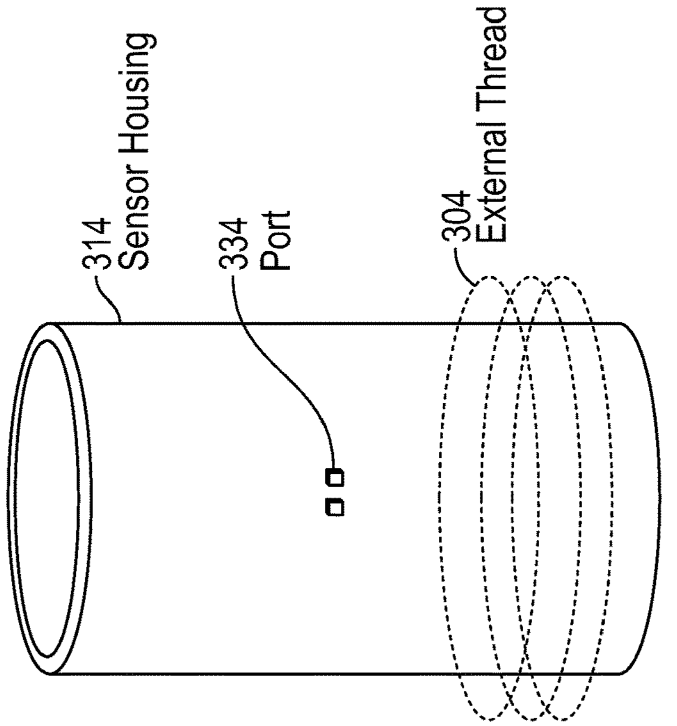
FIGS. 3A-B show schematic diagrams of a sensor system in accordance with one or more embodiments in a deconstructed view and a constructed view, respectively.
Figure 3A:
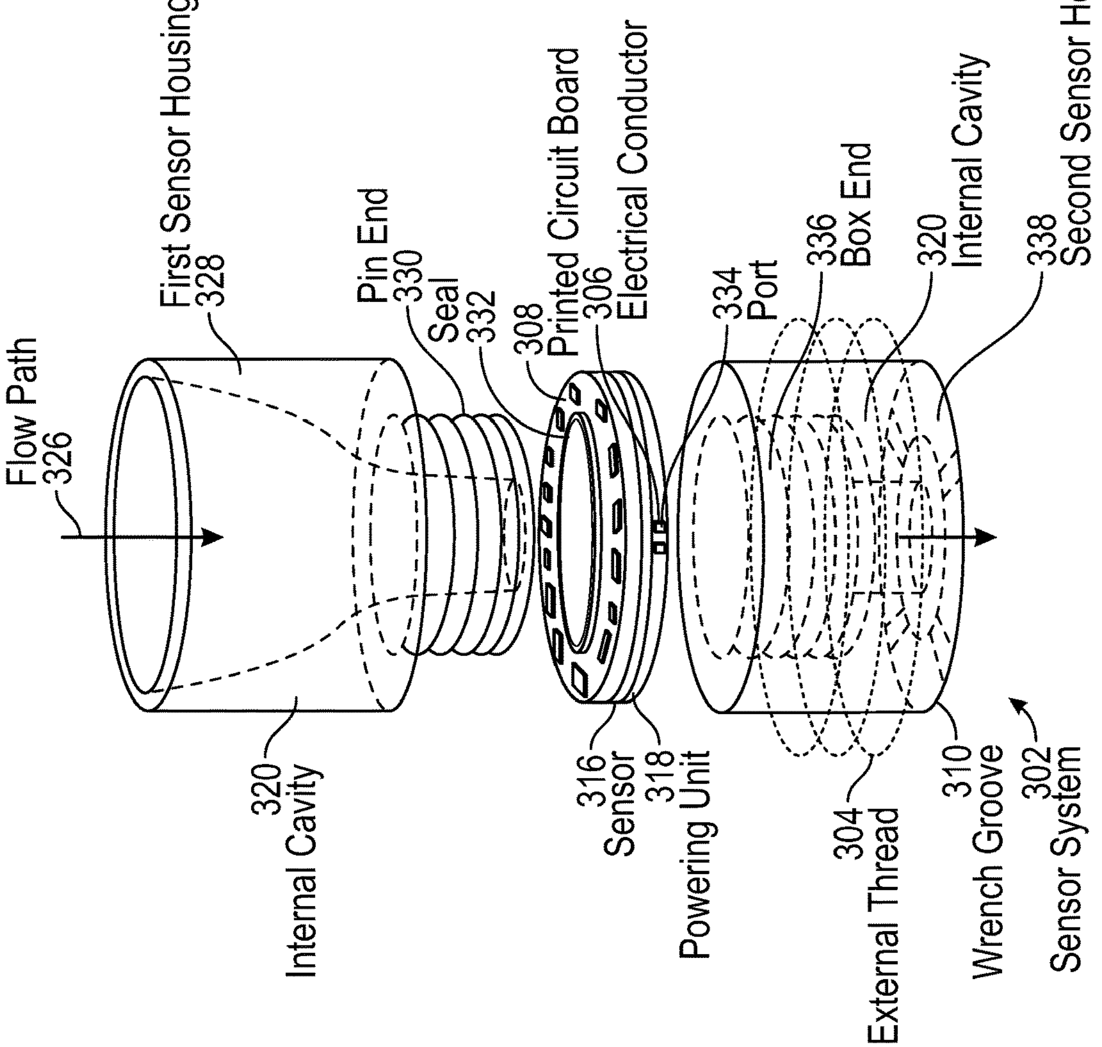

FIGS. 3A and 3B depict, in one or more embodiments, a sensor system (302) that may be installed in a drill bit (112) to be deployed in a wellbore (102) by a drill string (108) to gather downhole drilling conditions. FIG. 3A shows the sensor system (302) partially disassembled to show components within the sensor system (302), and FIG. 3B shows the assembled sensor system (302). As shown in FIG. 3A, the sensor system (302) may include a sensor housing (314), at least one sensor (316), an internal cavity (320), a powering unit (318), a seal (332), a PCB (308), an electrical conductor (306), and a port (334). The sensor housing (314) may include a first sensor housing (328) comprising a pin end (330) and a second sensor housing (338) comprising a box end (336). The pin end (330) and the box end (336) may be threaded together, and when threaded together, an inner surface of the first sensor housing (328) and an inner surface of the second sensor housing (338) may define the internal cavity (320).

The sensor(s) (316), seal (332), PCB (308), electrical conductor (306), and powering unit (318) may be in a ring configuration having an inner diameter larger than an outer diameter of the pin end (330) such that the ring configuration can fit around the pin end (330) of the first sensor housing (328). The pin end (330) may extend through the ring configuration of the sensor(s) (316), seal (332), PCB (308), electrical conductor (306), and powering unit (318) to be threaded into the box end (336), thereby sealing the sensor(s) (316), PCB (308), electrical conductor (306), and powering unit (318) within the internal cavity (320). The port (334) of the electrical conductor (306) may be exposed to an outer surface of the sensor housing (314) while the electrical conductor (306) is sealed within the internal cavity (320). The sensor housing (314) may form an operable nozzle which allows fluid to flow along a flow path (326) through the sensor housing (314). As shown in FIG. 3, the flow path (326) may extend co-axially with a central axis of the sensor housing (314) through the entire length of the sensor housing (314). The seal (332) may provide an extra barrier between the sensors (316), PCB (308), electrical conductor (306), and powering unit (318) of the sensor system (302) and the drilling fluid flowing through the sensor housing (314).

The sensor housing (314) may be made of any material, such as a hard chrome and copper material, a resin, or any other polymer material that has a relatively high resistance to high temperatures and erosion and can resist the abrasive and corrosive impact of the jetted drilling fluid. As shown in FIG. 3B, the sensor housing (314) may have a generally cylindrical shape when the first sensor housing (328) is assembled to the second sensor housing (338), which may fit into a drill bit (112) nozzle receptacle having a corresponding cylindrical shape located on the surface of the drill bit (112). At least one external thread (304) may be wrapped around the outer surface of the sensor housing (314), and at least one internal thread may be formed around an internal surface of the nozzle receptacle. The external thread (304) of the sensor housing (314) may correspond to the internal thread of the nozzle receptacle such that the sensor housing (314) may be threaded into and out of the nozzle receptacle by the internal thread and the external thread (304). Further, the sensor housing (314) may have a wrench groove (310) on one external end of the sensor housing (314), which may be used for threading the sensor housing (314) into and from a drill bit (112) nozzle receptacle.

The PCB (308) may mechanically support and electrically connect the electrical and electronic components of the sensor system (302) using conductive tracks, pads, and other features. The PCB (308) may be single sided, dual sided, or multi-layered. The outer layers may be made out of an insulating material with a layer of copper foil laminated to the insulating material. The inner layers of the of the multi-layered PCB (308) may alternate copper and insulating layers, for example. In some embodiments, the surface of the PCB (308) may have a coating that protects the cooper from corrosion and reduces the chances of electrical shorts.

The sensor(s) (316) may be pressure sensors, accelerometers, gyroscopic sensors, magnetometer sensors, temperature sensors, or other downhole sensor. The sensor(s) (316) may gather data about a drill bit (112) and downhole conditions during the drilling operation. The data may be stored on the PCB (308) and/or sent to the surface in real time using mud pulser telemetry or electromagnetic telemetry, however any method of sending downhole data to the surface may be used without departing from the scope of this disclosure herein.

The powering unit (318) may store and convert energy supplied by a charging and communication interface. The electrical conductor (306) may be a coil, an antenna, or a contact pad. The coil may be a single coil, multiple coils, or a combined coil. The antenna may be a PCB (308) based antenna or a ceramic antenna. The coil and the antenna may aid in wireless power transmission. The number of coils, as well as choice of coil vs. antenna, may depend on the required efficiency, coupling mechanisms, power consumption, and transmission distance. The wireless charging may be achieved by inductive coupling or magnetic resonance coupling. The communication may be achieved by using high frequency Bluetooth technology. The electrical conductor (306) of the sensor system (302) may correspond in location with an electrical conductor of a charging and communication interface when the sensor system (302) interfaces with the charging and communication interface. In further embodiments, the electrical conductor (306) of FIGS. 3A and 3B is a contact pad wherein the port (334) allows for direct contact (not wireless) charging of the sensor system (302). The electrical conductor (306) may be installed on the powering unit (318). The powering unit (318) may be connected to the sensor(s) (316) and the sensor(s) (316) may be connected to the PCB (308). The seal (332) may be located between an outer perimeter of the pin end (330) and an inner perimeter of the ring configuration of the PCB (308), sensors (316), powering unit (318), and electrical conductor (306). In some embodiments, the seal (332) may be provided separately from the PCB (308), sensor(s) (316), powering unit (318), and electrical conductor (306) and positioned between or around the sealing surfaces of the pin end (330) and box end (336) to seal the internal cavity (320).

Figure 4:
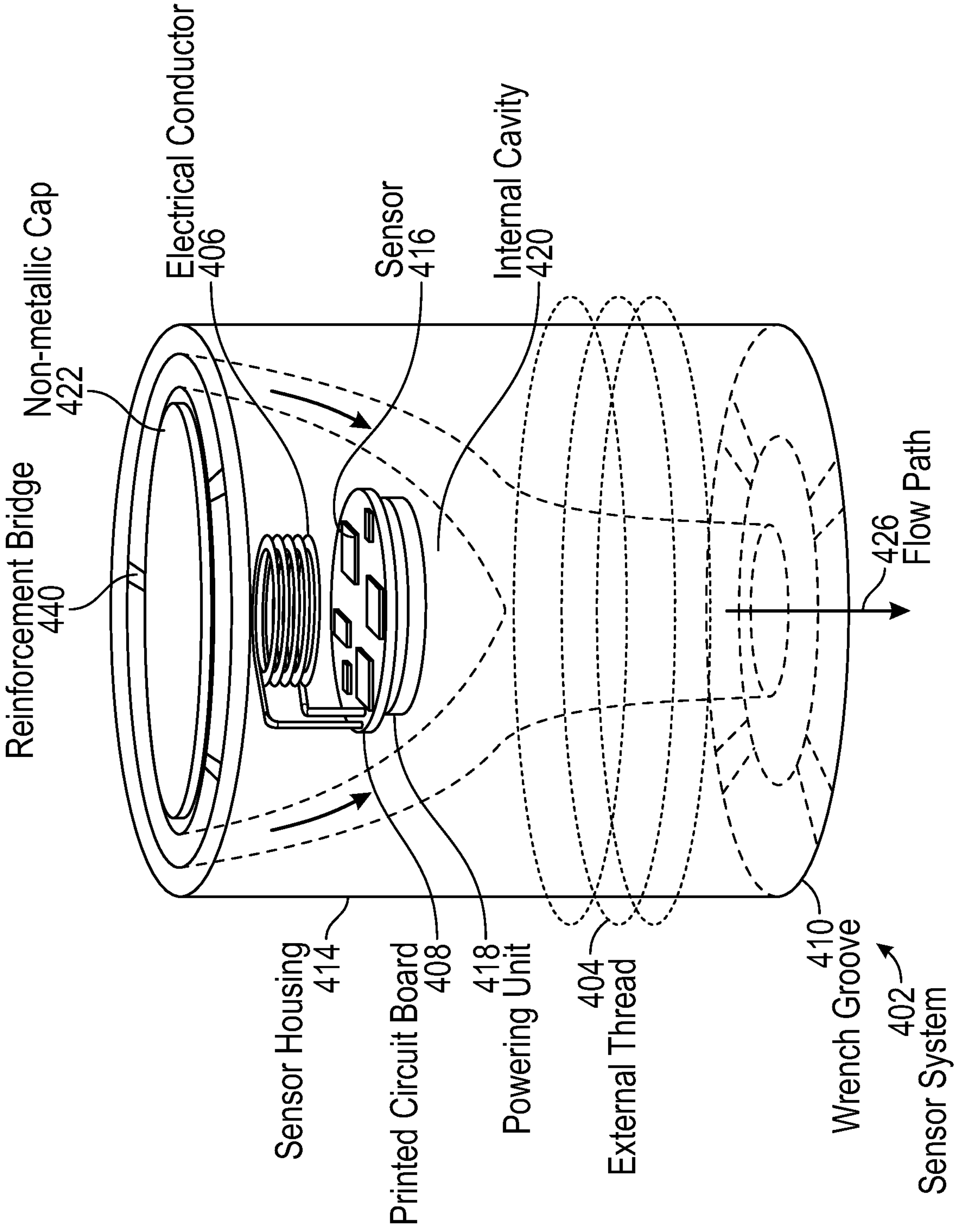
FIG. 4 is a schematic diagram of a sensor system in accordance with one or more embodiments.

FIG. 4 depicts, in one or more embodiments, a sensor system (402) that may be installed in a drill bit (112) to be deployed in a wellbore (102) by a drill string (108) to gather downhole drilling conditions. The sensor system (402) may include a sensor housing (414), a non-metallic cap (422), an electrical conductor (406), at least one sensor (416), an internal cavity (420), a PCB (408), and a powering unit (418). The non-metallic cap (422) may allow access for wireless power transmission and data communication. The non-metallic cap (422) may be non-metallic and non-conductive in order for the wireless power transmission and data communication to be efficient as electromagnetic waves attenuate significantly/lose their power as they pass though metallic/conductive materials. The non-metallic cap (422) may be installed on an open end of the internal cavity (420) to seal the internal cavity (420). The sensor housing (414) may have a central bore formed axially therethrough, which may form a flow path (426) for fluid to flow through. The internal cavity (420) may be an enclosure that is held in a fixed position within the central bore using at least one reinforcement bridge (440) extending between and connecting an outer wall of the sensor housing (414) and the internal cavity (420). For example, reinforcement bridges (440) may be metal pins, welds, or other discrete connection elements that hold the internal cavity (420) in a fixed position relative to the sensor housing (414) while also allowing fluid to flow through the flow path (414). In such a manner, the sensor housing (414) may form an operable nozzle which allows fluid to flow in a flow path (426) extending around the reinforcement bridge(s) (440) and between the internal cavity (420) and the outer wall of the sensor housing (414).

The sensor housing (414) is a cylinder that may be made of any material, such as a hard chrome and copper material, a resin, or any other polymer material that has a relatively high resistance to high temperatures and erosion and can resist the abrasive and corrosive impact of the jetted drilling fluid.

At least one external thread (404) may be wrapped around the sensor housing (414) and at least one internal thread may be formed around an internal surface of the nozzle receptacle. The external thread (404) of the sensor housing (414) corresponds to the internal thread of the nozzle receptacle and the sensor housing (414) may be threaded into and out of the nozzle receptacle by the internal thread and the external thread (404). In other embodiments, the sensor housing (414) may not have external threads (404) for a threaded connection to a nozzle receptacle. For example, a sensor system may be retained using one or more retaining elements that block the sensor system from coming out of the nozzle receptacle, such as a retaining element that extends from the nozzle receptacle to cover at least a portion of a top surface of the sensor housing or a latching mechanism.

The sensor housing (414) may have a wrench groove (410) on one external end of the sensor housing (414), opposite the axial end of the sensor housing (414) in which the non-metallic cap (422) is held. The wrench groove (410) may be used to apply torque to the sensor housing (414) for threadably installing and removing the sensor housing (414) into and from a drill bit (112) nozzle receptacle, wherein the drill bit (112) nozzle receptacle is a corresponding cylindrical cavity located on the surface of the drill bit (112). In other embodiments, a different protruding feature may be formed on an axial end of the sensor housing (414) to use to pull the sensor housing (414) out of or insert into a nozzle receptacle.

The internal cavity (420) is a void that may be pressure sealed, self-contained, and located within the sensor housing (414). The internal cavity (420) may house the PCB (408), sensors (416), electrical conductor (406), and powering unit (418). The PCB (408) may mechanically support and electrically connect the electrical and electronic components of the sensor system (402) using conductive tracks, pads, and other features. The PCB (408) may be single sided, dual sided, or multi-layered. The outer layers may be made out of an insulating material with a layer of copper foil laminated to the insulating material. The inner layers of the of the multi-layered PCB (408) may alternate copper and insulating layers. The surface of the PCB (408) may have a coating that protects the cooper from corrosion and reduces the chances of electrical shorts.

The sensors (416) may be pressure sensors, accelerometers, gyroscopic sensors, magnetometer sensors, and temperature sensors, however, any sensor (416) may be used without departing from the scope of the disclosure herein. The sensors (416) may gather data about a drill bit (112) and downhole conditions during the drilling operation. The data may be stored on the PCB (408) and/or sent to the surface in real time using mud pulser telemetry or electromagnetic telemetry, however any method of sending downhole data to the surface may be used without departing from the scope of this disclosure herein.

The powering unit (418) may store and convert energy supplied by a charging and communication interface. The electrical conductor (406) may be a coil, an antenna, or a contact pad. The coil may be a single coil, multiple coils, or a combined coil. The antenna may be a PCB (408) based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (406) of the sensor system (402) may correspond in location with an electrical conductor of a charging and communication interface when the sensor housing (414) interfaces with the charging and communication interface. Wireless charging of the sensor system (402) may be achieved by inductive coupling or magnetic resonance coupling. Communication between the sensor system (402) and the charging and communication interface may be achieved by using high frequency Bluetooth technology. The sensors (416) may be attached to the PCB (408), the electrical conductor (406) may be connected to the PCB (408), and the PCB (408) is connected to the powering unit (418).

Figure 5:
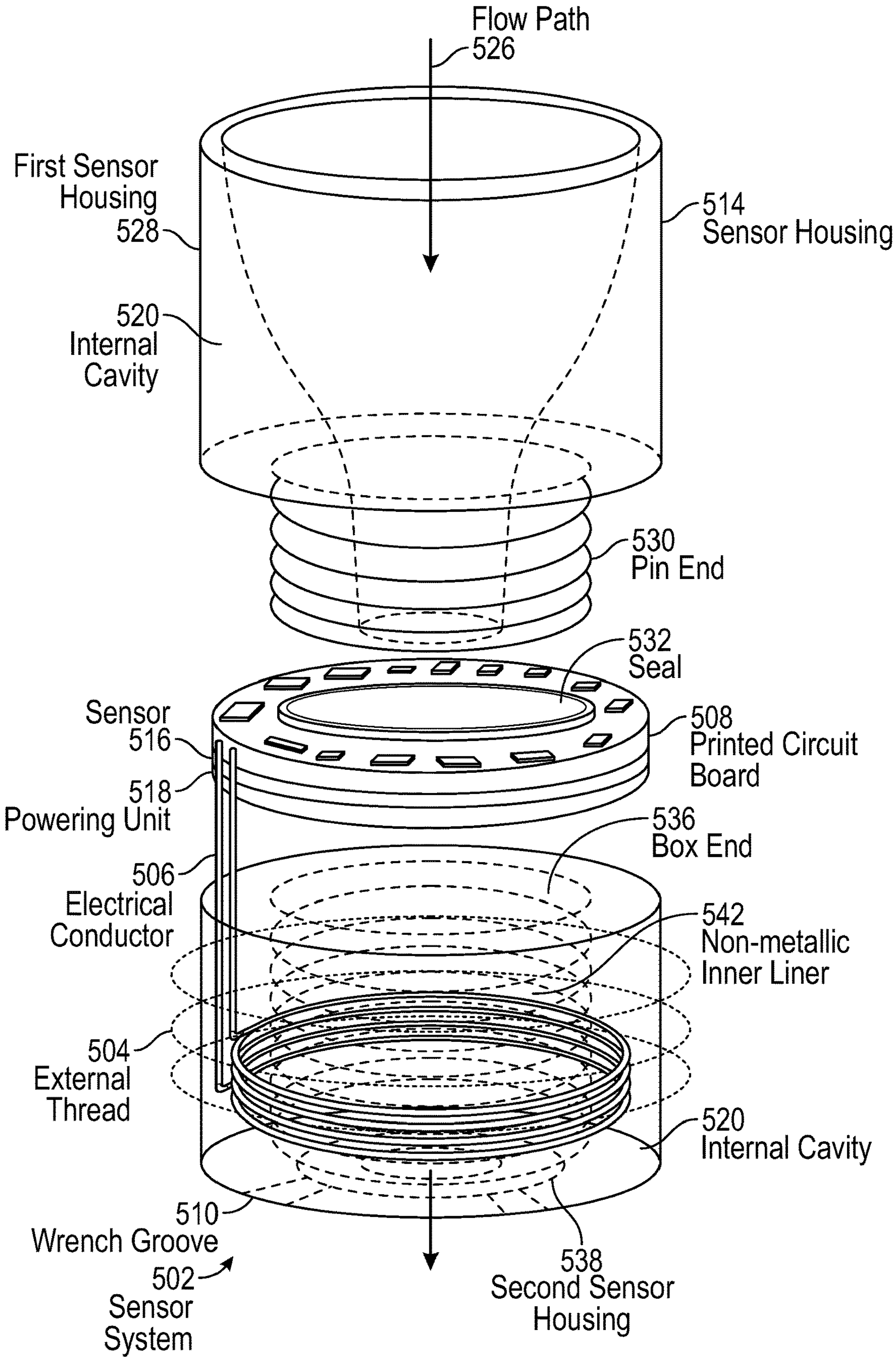
FIG. 5 is a schematic diagram of a sensor system in accordance with one or more embodiments.

FIG. 5 depicts, in one or more embodiments, a sensor system (502) that may be installed in a drill bit (112) to be deployed in a wellbore (102) by a drill string (108) to gather downhole drilling conditions. The sensor system (502) may include a sensor housing (514), at least one sensor (516), an internal cavity (520), a powering unit (518), a seal (532), a PCB (508), and an electrical conductor (506). The sensor housing (514) may include a first sensor housing (528) comprising a pin end (530) and a second sensor housing (538) comprising a box end (536). The pin end (530) and the box end (536) may be threaded together, and when threaded together, an inner surface of the first sensor housing (528) and the inner surface of the second sensor housing (538) define the internal cavity (520).

The sensor(s) (516), seal (532), PCB (508), and powering unit (518) are shown in a ring configuration having an inner diameter larger than an outer diameter of the pin end (530) such that the ring configuration of the sensor(s) (516), seal (532), PCB (508), and powering unit (518) can extend entirely around the pin end (530) of the first sensor housing (528). The pin end (530) may extend through the ring configuration of the sensor(s) (516), seal (532), PCB (508), and powering unit (518) to be threaded into the box end (536), thereby sealing the sensor(s) (516), seal (532), PCB (508), electrical conductor (506), and powering unit (518) within the internal cavity (520). The electrical conductor (506) may be wrapped around the entire perimeter of an internal surface within the internal cavity (520). In the embodiment shown, the electrical conductor (506) may be disposed in the internal cavity (520) in the box end (536) of the sensor housing (514), and in some embodiments, the electrical conductor (506) may be disposed in the portion of the internal cavity (520) formed by the first sensor housing (528).

A non-metallic inner liner (542) may either form or line the internal surface of the box end (536). For example, the non-metallic inner liner (542) may be positioned around the internal surface of the box end (536) such that when the first and second sensor housings are attached, the non-metallic inner liner (542) is positioned between and interfaces the box end (536) internal surface and pin end (530) outer surface. In some embodiments, the non-metallic inner liner (542) may be positioned within the internal cavity (520) around the internal surface of the box end (536), such that when the pin end (530) is inserted into the box end (536), the pin end outer surface interfaces with the box end internal surface. In some embodiments, the box end (536) internal surface may be formed of or coated with a non-metallic material. The non-metallic inner liner (542) may be positioned in the sensor system (502) in a manner relative to the electrical conductor (506) such that when the sensor system (502) interfaces with a charging device, the non-metallic liner (542) is positioned between the electrical conductor (506) and the charging device to allow for wireless power transmission (and/or data communication when interfacing with a communication device). The wireless charging may be achieved by inductive coupling or magnetic resonance coupling. The communication may be achieved by using high frequency Bluetooth technology. In embodiments where the non-metallic liner (542) is positioned between and interfaces with the pin end outer surface and box end internal surface, the non-metallic liner (542) may provide sealing between the box end (536) and pin end (530).

The sensor housing (514) may be an operable nozzle which allows fluid to flow along a flow path (526) through the sensor housing (514). The flow path (526) may be formed centrally through the length of the sensor housing (514), e.g., co-axially with a central axis of the sensor housing (514). The flow path (526) may have a substantially uniform inner dimension along its length, or as shown in FIG. 5, may have a varying inner dimension along its length. For example, a portion of the flow path (526) may have a reduced inner diameter to create a venturi effect for fluid flowing through the flow path (526). The size and shape of the flow path (526) may be designed to provide a selected flow rate or flow pattern of fluid flowing through the flow path (526). The seal (532) may provide an extra barrier between the sensor(s) (516), PCB (508), and powering unit (518) of the sensor system (502) and the drilling fluid flowing through the sensor housing (514).

The sensor housing (514) may have a cylindrically-shaped body that may be made of any material, such as a hard chrome and copper material, a resin, or any other polymer material that has a relatively high resistance to high temperatures and erosion and can resist the abrasive and corrosive impact of the jetted drilling fluid. The sensor housing (514) may have a wrench groove (510) on one external end of the sensor housing (514). The wrench groove (510) may allow for installation and removal of the sensor housing (514) into and from a drill bit (112) nozzle receptacle wherein the drill bit (112) nozzle receptacle is a corresponding cylindrical cavity located on the surface of the drill bit (112). At least one external thread (504) may be wrapped around the sensor housing (514) and at least one internal thread may be formed around an internal surface of the nozzle receptacle. The external thread (504) of the sensor housing (514) corresponds to the internal thread of the nozzle receptacle, and the sensor housing (514) may be threaded into and out of the nozzle receptacle by the internal thread and the external thread (504).

The PCB (508) may mechanically support and electrically connect the electrical and electronic components of the sensor system (502) using conductive tracks, pads, and other features. The PCB (508) may be single sided, dual sided, or multi-layered. The outer layers may be made out of an insulating material with a layer of copper foil laminated to the insulating material. The inner layers of the of the multi-layered PCB (508) may alternate copper and insulating layers. The surface of the PCB (508) may have a coating that protects the cooper from corrosion and reduces the chances of electrical shorts.

The sensor(s) (516) may be pressure sensors, accelerometers, gyroscopic sensors, magnetometer sensors, and temperature sensors, however, any sensor (516) may be used without departing from the scope of the disclosure herein. The sensor(s) (516) may gather data about a drill bit (112) and downhole conditions during the drilling operation. The data may be stored on the PCB (508) and/or sent to the surface in real time using mud pulser telemetry or electromagnetic telemetry, however any method of sending downhole data to the surface may be used without departing from the scope of this disclosure herein.

The powering unit (518) may store and convert energy supplied by a charging and communication interface. The electrical conductor (506) may be a coil, an antenna, or a contact pad. The coil may be a single coil, multiple coils, or a combined coil. The antenna may be a PCB (508) based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (506) of the sensor system (502) may correspond in location with an electrical conductor of a charging and communication interface when the sensor system (502) interfaces with the charging and communication interface. The electrical conductor (506) may be connected to the powering unit (518), PCB (508), and sensors (516). The powering unit (518) may be connected to the sensor(s) (516) and the sensor(s) (516) may be connected to the PCB. The seal (532) may be located between an outer perimeter of the pin end (530) and an inner perimeter of the PCB (508), sensors (516), and powering unit (518).

Figure 6:
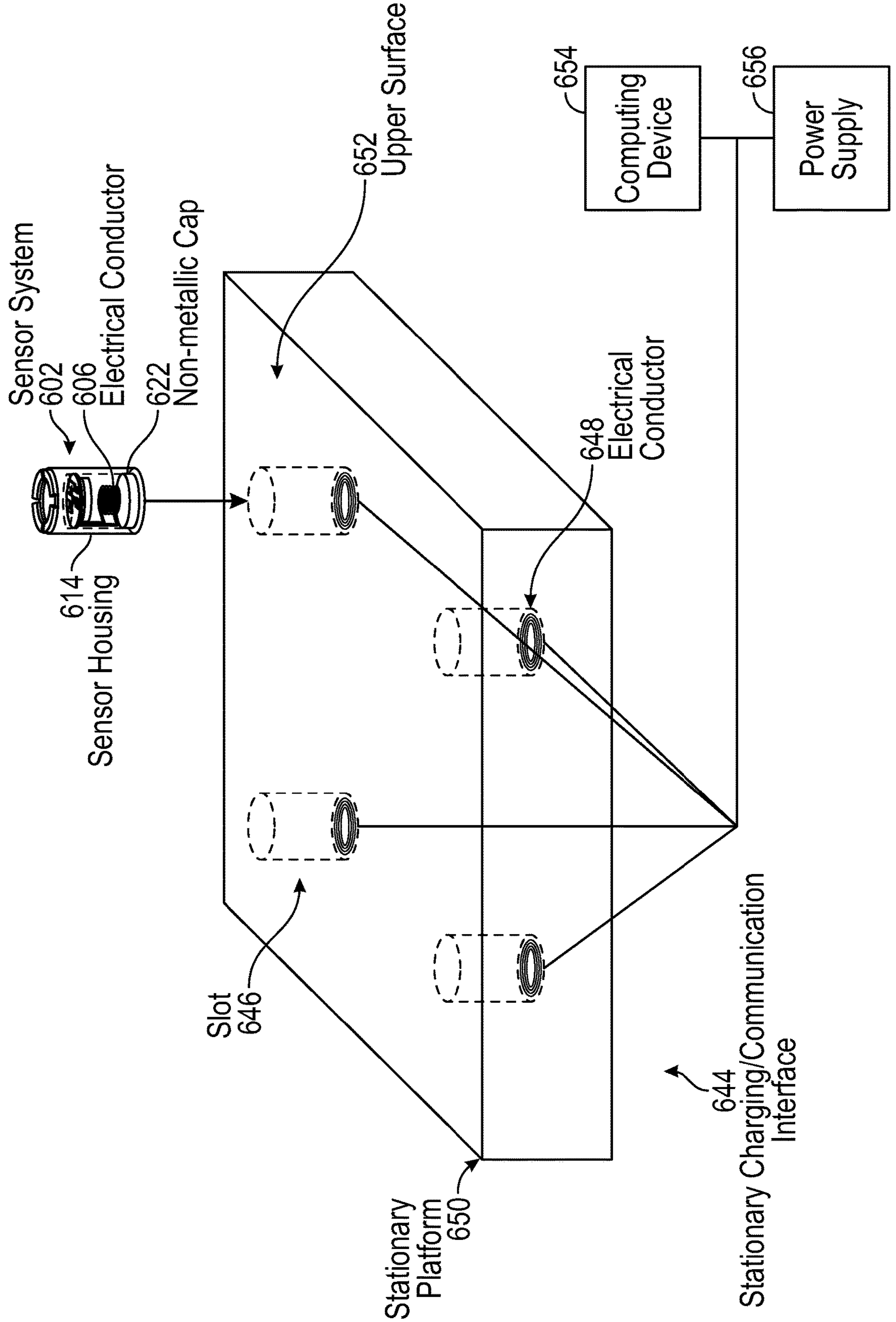
FIG. 6 is a schematic diagram of a charging and communication interface in accordance with one or more embodiments.

FIG. 6 depicts, in one or more embodiments, a stationary charging/communication interface (644) designed to communicate with and charge a sensor system (602), such as the sensor system (202) depicted in FIG. 2. The stationary charging/communication interface (644) may include a stationary platform (650), an upper surface (652), at least one slot (646), and at least one electrical conductor (648). The slot (646) extends a depth from the upper surface (652) into the stationary platform (650). The slot (646) may be shaped to fit the sensor housing (614) of the sensor system (602). For example, the slot (646) may have a cylindrical shape corresponding to a cylindrical-shaped sensor system (602). The stationary platform (650) may be made of materials such as industrial plastic materials including Acrylonitrile-Butadiene-Styrene (ABS), Polyvinyl Chloride (PVC), Acrylic or Polymethyl Methacrylate (PMMA), etc. The stationary platform (650) may also be made of metallic materials such as aluminum or alloy. However, the portion of the stationary platform (650) comprising the electrical conductor (648) may be made of plastic materials for effective transmission to occur. The electrical conductor (648) may be a coil, an antenna, or a contact pad. The antenna may be a PCB based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (648) of the stationary charging/communication interface (644) may correspond in location with an electrical conductor (606) of the sensor system (602) when the sensor system (602) is fit within the slot (646).

FIG. 6 depicts the electrical conductor (648) as a coil. The coil is installed on a bottom surface of the slot (646). The electrical conductor (648) is connected to a power supply (656) and a computing device (654). The power supply (656) may be a DC power supply, such as a battery, or an AC power supply, such as an outlet. When the sensor system (602) is inserted into the slot (646) and the electrical conductor (648) of the stationary charging/communication interface (644) connects (e.g., wirelessly, as shown in FIG. 6) to the electrical conductor (606) of the sensor system (602), the stationary charging/communication interface (644) may interact with the sensor system (602) by transferring data, charging the sensor system (602), and/or programming/activating the sensor system (602). The wireless charging may be achieved by inductive coupling or magnetic resonance coupling. The communication may be achieved by using high frequency Bluetooth technology.

A non-metallic cap (622) may be positioned in the sensor system (602) to prevent direct contact between the electrical conductor (606) in the sensor system (602) and the electrical conductor (648) of the stationary charging/communication interface (644). For example, in the embodiment shown in FIG. 6, the non-metallic cap (622) may be positioned between the electrical conductor (606) of the sensor system (602) and the electrical conductor (648) of the stationary charging/communication interface (644). In some embodiments, a sensor system may be provided without a non-metallic cap (or other configuration of a non-metallic interface such as the non-metallic liner (542) shown in FIG. 5), where an electrical conductor in the sensor system may directly contact the electrical conductor (648) in the charging/communication interface (644).

Figure 7:
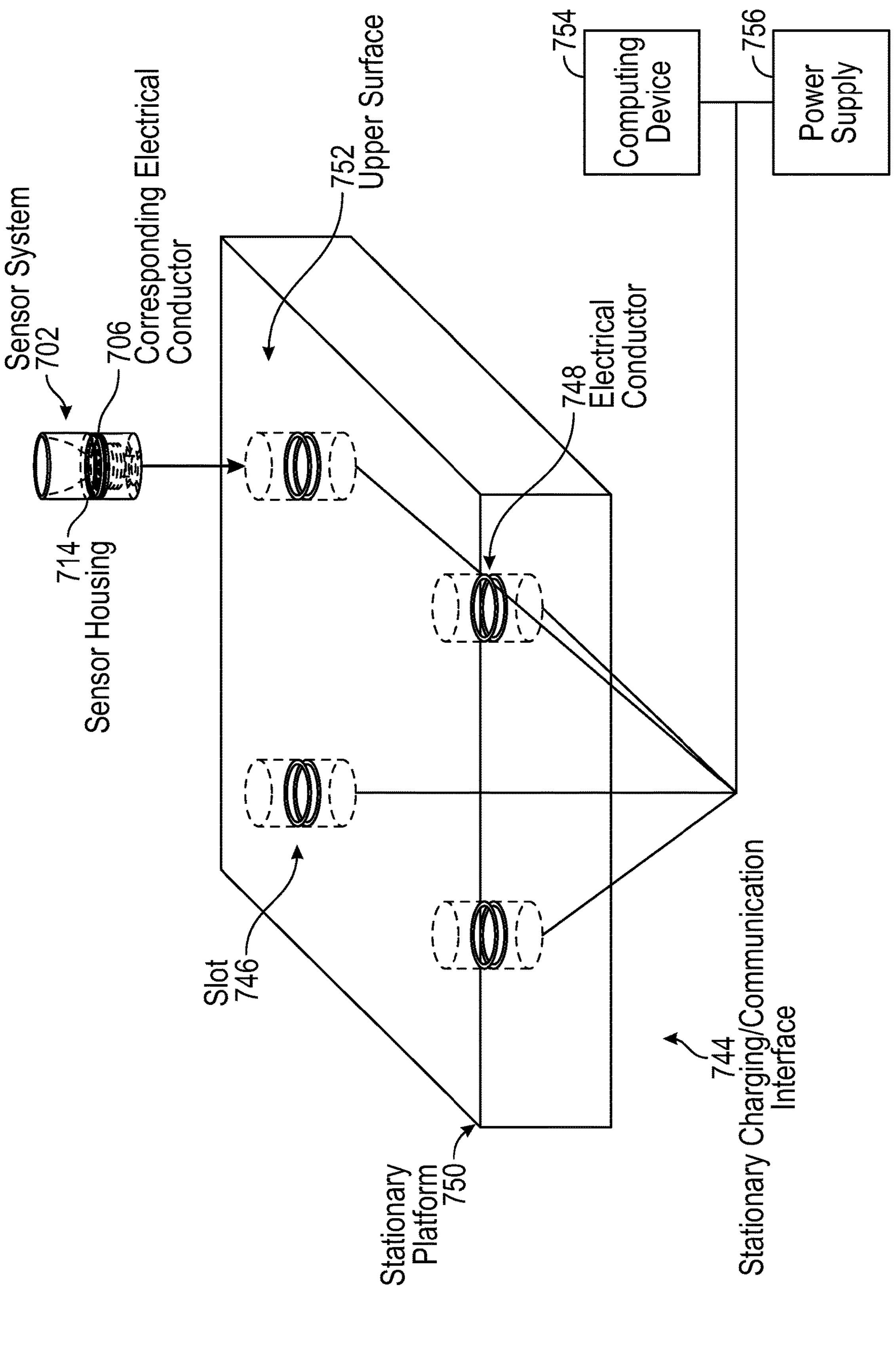
FIG. 7 is a schematic diagram of a charging and communication interface in accordance with one or more embodiments.

FIG. 7 depicts, in one or more embodiments, a stationary charging/communication interface (744) designed to communicate with and charge a sensor system (702) such as the sensor system (302) depicted in FIG. 3. The stationary charging/communication interface (744) may include a stationary platform (750), an upper surface (752), at least one slot (746), and at least one electrical conductor (748). The slot (746) extends a depth from the upper surface (752) into the stationary platform (750). The slot (746) may be shaped to receive the sensor housing (714) of the sensor system (702), such that the sensor housing (714) may at least partially fit within the slot (746). The stationary platform (750) may be made of materials such as industrial plastic materials including Acrylonitrile-Butadiene-Styrene (ABS), Polyvinyl Chloride (PVC), Acrylic or Polymethyl Methacrylate (PMMA), etc. The stationary platform (750) may also be made of metallic materials such as aluminum or alloy. However, the portion of the stationary platform (750) comprising the electrical conductor (748) may be made of plastic materials or other non-conductive material for effective transmission to occur. The electrical conductor (748) may be a coil, an antenna, or a contact pad. The antenna may be a PCB based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (748) of the stationary charging/communication interface (744) may correspond in location with an electrical conductor (706) of the sensor system (702) when the sensor system (702) is fit within the slot (746).

FIG. 7 depicts the electrical conductor (748) as a contact pad. The contact pad is wrapped around a side surface in a middle section of each slot (746), wherein the middle section is located axially along the depth of the slot (746), between a bottom surface of the slot (746) and the upper surface (752) of the stationary platform (750). The electrical conductor (748) may be connected to a power supply (756) and a computing device (754). The power supply (756) may be a DC power supply, such as a battery, or an AC power supply, such as an outlet. When the sensor system (702) is inserted into the slot (746) and the electrical conductor (748) of the stationary charging/communication interface (744) connects (e.g., through direct contact as shown in FIG. 7) to the electrical conductor (706) of the sensor system (702), the stationary charging/communication interface (744) may interact with the sensor system (702) by transferring data, charging the sensor system (702), and/or programming/activating the sensor system (702). Wireless charging of the sensor system (702) may be achieved by inductive coupling or magnetic resonance coupling between the electrical conductor (748) of the stationary charging/communication interface (744) and the corresponding electrical conductor (706) of the sensor system (702). Other communication between the stationary charging/communication interface (744) and the sensor system (702) may be achieved by using high frequency Bluetooth technology.

Electrical conductors in a stationary charging/communication interface may be positioned at various locations within a slot to correspond in location to the position of an electrical conductor within a sensor system. For example, an electrical conductor of a stationary charging/communication interface may be positioned on a bottom surface of a slot such as shown in FIG. 6, along a side surface of the slot such as shown in FIG. 7, and/or along a protruding element in the slot such as shown in FIG. 8, described more below.

Figure 8:
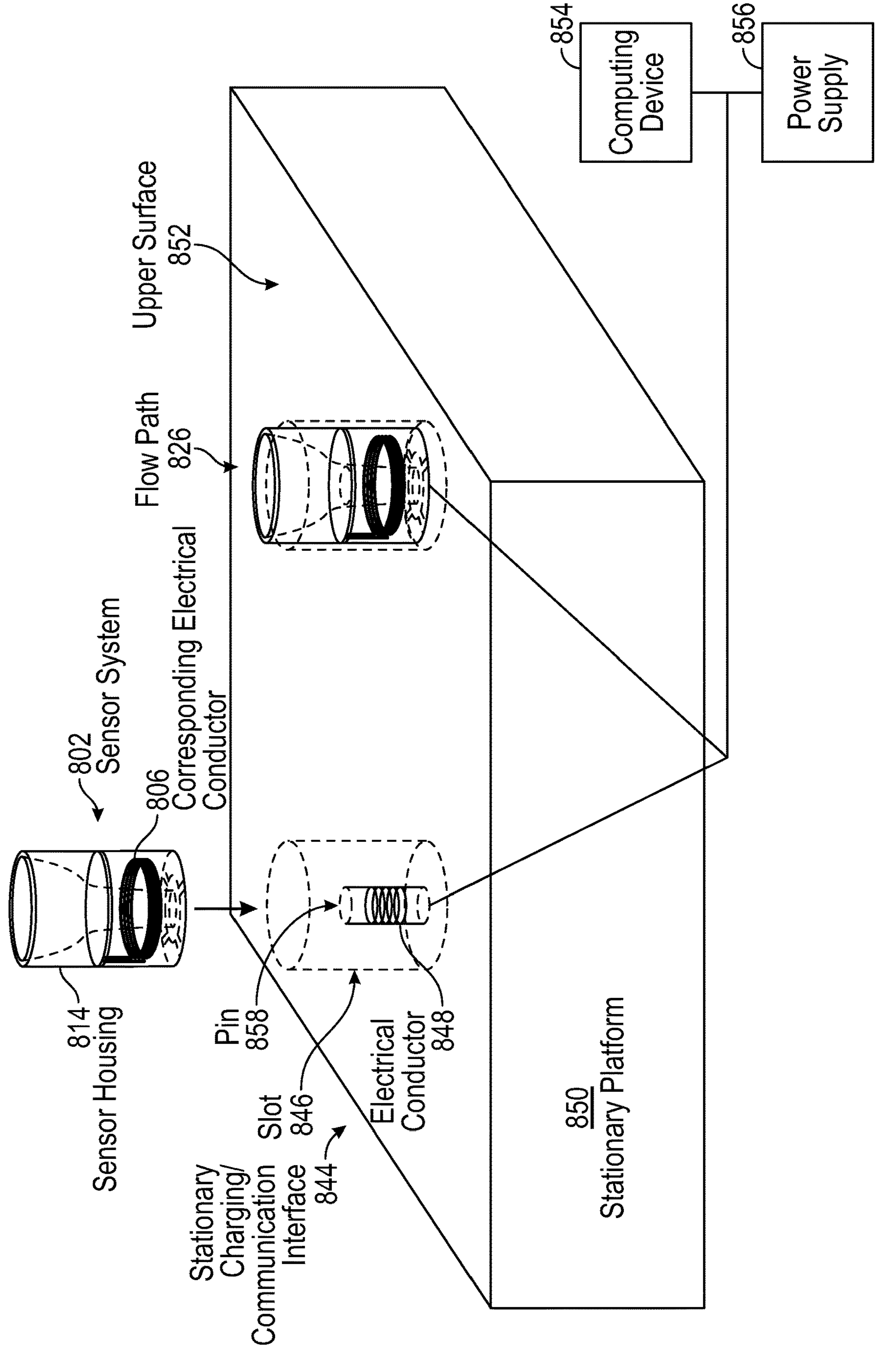
FIG. 8 is a schematic diagram of a charging and communication interface in accordance with one or more embodiments.

FIG. 8 depicts, in one or more embodiments, a stationary charging/communication interface (844) designed to communicate with and charge a sensor system such as the sensor systems (402, 502) depicted in FIGS. 4 and 5. The stationary charging/communication interface (844) comprises a stationary platform (850), an upper surface (852), at least one slot (846), and at least one electrical conductor (848). The slot (846) extends a depth from the upper surface (852) into the stationary platform (850). The stationary platform (850) may be made of materials such as industrial plastic materials including Acrylonitrile-Butadiene-Styrene (ABS), Polyvinyl Chloride (PVC), Acrylic or Polymethyl Methacrylate (PMMA), etc. The stationary platform (850) may also be made of metallic materials such as aluminum or alloy. However, the portion of the stationary platform (850) comprising the electrical conductor (848) may be made of plastic materials for effective transmission to occur.

The stationary charging/communication interface (844) may also include a pin (858) extending a height from a bottom surface of the slot (846) wherein the height of the pin (858) is less than the depth of the slot (846). The slot (846) and the pin (858) may be shaped to receive a sensor system (802), such that the sensor housing (814) of the sensor system (802) may at least partially fit within the slot (846) and mate with the pin (858). The pin (858) may extend at least partially through the flow path (826) of the sensor system (802) when the sensor system (802) is inserted into the slot (846). The electrical conductor (848) may be a coil, an antenna, or a contact pad. The antenna may be a PCB based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (848) of the stationary charging/communication interface (844) corresponds with an electrical conductor (806) of the sensor system (802).

FIG. 8 depicts the electrical conductor (848) as a coil. The coil is wrapped around an outer perimeter of the pin (858). The electrical conductor (848) may be connected to a power supply (856) and a computing device (854). The power supply (856) may be a DC power supply, such as a battery, or an AC power supply, such as an outlet. When the sensor system (802) is inserted into the slot (846) and the electrical conductor (848) of the stationary charging/communication interface (844) connects (e.g., wirelessly or through direct contact) to the electrical conductor (806) of the sensor system (802), the stationary charging/communication interface (844) may interact with the sensor system (802) by transferring data, charging the sensor system (802), and/or programming/activating the sensor system (802). Wireless charging of the sensor system (802) may be achieved by inductive coupling or magnetic resonance coupling between the electrical conductor (848) of the stationary charging/communication interface (844) and the corresponding electrical conductor (806) of the sensor system (802). Other communication between the stationary charging/communication interface (844) and the sensor system (802) may be achieved by using high frequency Bluetooth technology.

FIGS. 6-8 show different examples of charging/communication interfaces according to embodiments of the present disclosure that are referred to as being stationary, which is used to describe a charging/communication interface that may be stationary relative to the sensor systems being charged and/or electronically accessed. In such embodiments, a stationary charging/communication interface may be placed in a selected location and one or more sensor systems may be brought to the stationary charging/communication interface to charge and/or electronically access the sensor system. According to embodiments of the present disclosure, stationary charging/communication interfaces may be moved to different locations (e.g., to a well site or to a lab), or stationary charging/communication interfaces may remain at a single location. For example, a stationary charging/communication interface having an overall size less than a human (e.g., having less than 20 slots and/or weighing less than 20 pounds) may be moved to different well sites for use with different drilling operations.

In some embodiments, charging/communication interfaces may be designed to be portable, wherein a portable charging/communication interface may be brought to a sensor system to charge and/or electronically access the sensor system. For example, portable charging/communication interfaces disclosed herein may be brought to a sensor system held within a drill bit or other downhole cutting tool, and the portable charging/communication interface may charge and/or electronically access the sensor system while the sensor system remains in the drill bit. In some embodiments, a portable charging/communication interface may be brought to a sensor system that is not held within a downhole cutting tool to charge and/or electronically access the sensor system.

Figure 9:
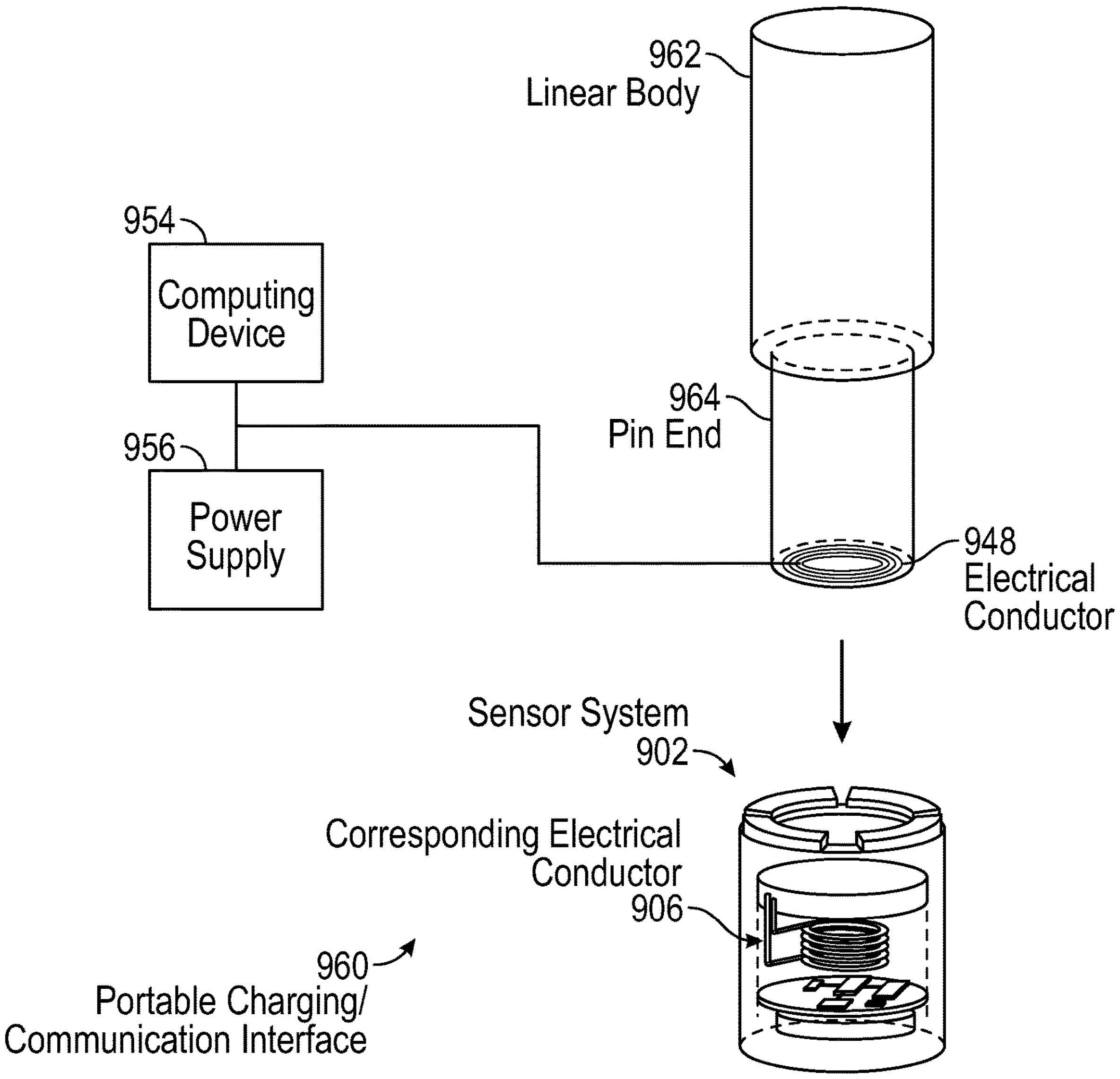
FIG. 9 is a schematic diagram of a charging and communication interface in accordance with one or more embodiments.

For example, FIG. 9 depicts, in one or more embodiments, a portable charging/communication interface (960) designed to communicate with and charge a sensor system (e.g., sensor systems (202, 402) depicted in FIGS. 2 and 4). The portable charging/communication interface (960) may include a portable linear body (962) comprising a pin end (964) extending linearly from one end of the linear body (962) and at least one electrical conductor (948). The linear body (962) and the pin end (964) may be made of materials such as industrial plastic materials including Acrylonitrile-Butadiene-Styrene (ABS), Polyvinyl Chloride (PVC), Acrylic or Polymethyl Methacrylate (PMMA), etc. The linear body (962) and a portion of the pin end (964) may also be made of metallic materials such as aluminum or alloy. However, the portion of the pin end (964) comprising the electrical conductor (948) may be made of plastic materials or other non-conductive material for effective transmission to occur.

The electrical conductor (948) may be installed on a bottom surface of the pin end (964). The electrical conductor (948) may be a coil, an antenna, or a contact pad. The antenna may be a PCB based antenna or a ceramic antenna. The coil and the antenna may aid in wireless power transmission. The number of coils, as well as choice of coil vs. antenna, may depend on the required efficiency, coupling mechanisms, power consumption, and transmission distance. The electrical conductor (948) of the portable charging/communication interface (960) may correspond in location with an electrical conductor (906) of the sensor system (902) when the charging/communication interface (960) interfaces with the sensor system (902). The electrical conductor (948) may be connected to a power supply (956) and a computing device (954).

The power supply (956) may be a DC power supply, such as a battery, or an AC power supply, such as an outlet. For example, the power supply (956) may include one or more batteries held within the linear body (962). When the portable communication interface (960) interfaces with the sensor system (902) (e.g., by inserting the pin end partially into the sensor system housing), and the electrical conductor (948) of the portable charging/communication interface (960) is within a set distance to the electrical conductor (906) of the sensor system (902), the portable charging/communication interface (960) may interact with the sensor system (902) by transferring data, charging the sensor system (902), and/or programming/activating the sensor system (902). Wireless charging of the sensor system (902) may be achieved by inductive coupling or magnetic resonance coupling between the electrical conductor (948) of the portable charging/communication interface (960) and the corresponding electrical conductor (906) of the sensor system (902). Other communication between the portable charging/communication interface (960) and the sensor system (902) may be achieved by using high frequency Bluetooth technology.

Figure 10:
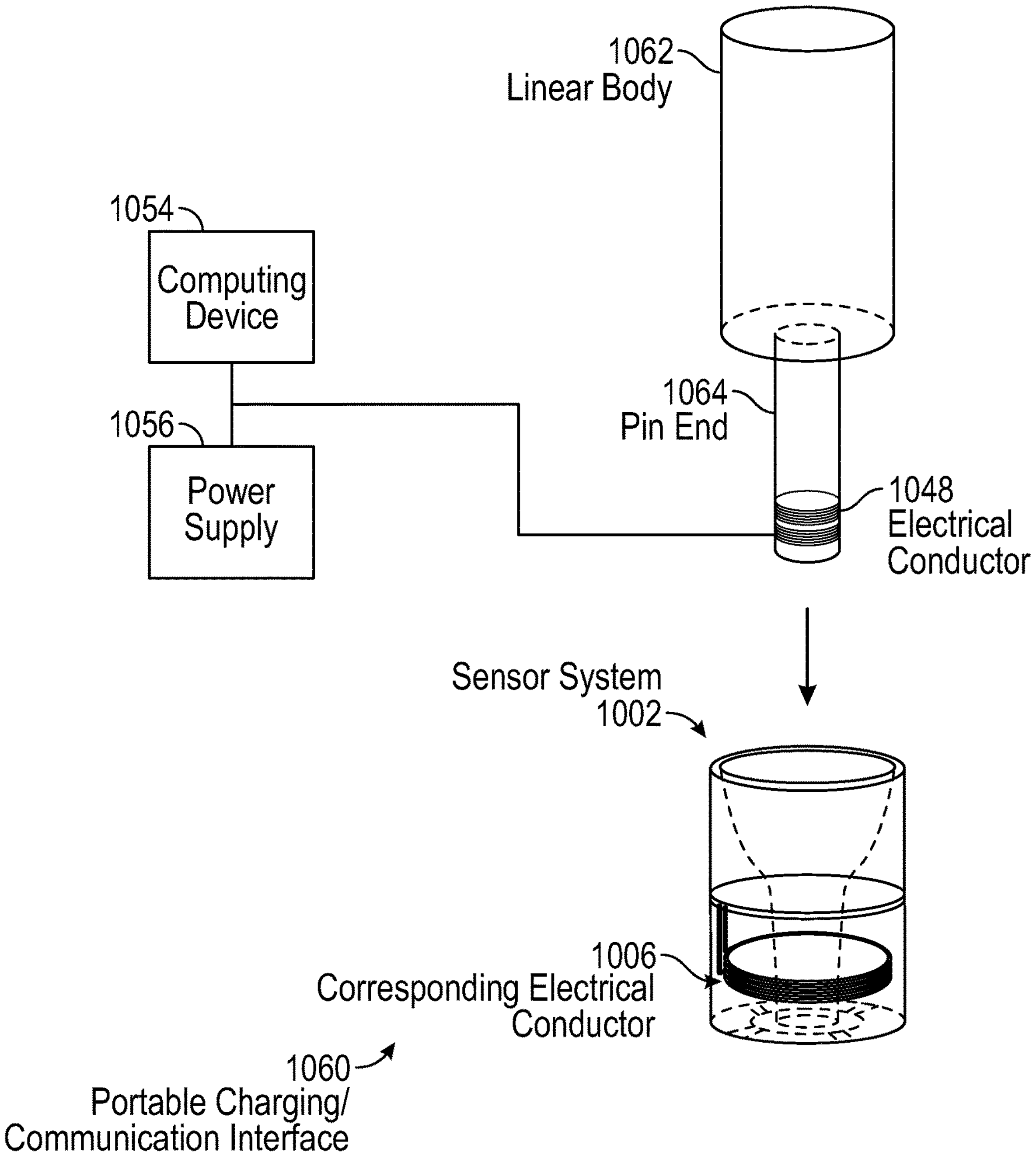
FIG. 10 is a schematic diagram of a charging and communication interface in accordance with one or more embodiments.

FIG. 10 depicts, in one or more embodiments, a portable charging/communication interface (1060) designed to communicate with and charge a sensor system such as the sensor systems (302, 502) depicted in FIGS. 3 and 5. The portable charging/communication interface (1060) may include a portable linear body (1062) comprising a pin end (1064) extending linearly from one end of the linear body (1062) and at least one electrical conductor (1048). The linear body (1062) and the pin end (1064) may be made of materials such as industrial plastic materials including Acrylonitrile-Butadiene-Styrene (ABS), Polyvinyl Chloride (PVC), Acrylic or Polymethyl Methacrylate (PMMA), etc. The linear body (1062) and a portion of the pin end (1064) may also be made of metallic materials such as aluminum or alloy. However, the portion of the pin end (1064) comprising the electrical conductor (1048) may be made of plastic materials for effective transmission to occur.

The electrical conductor (1048) may be a coil, an antenna, or a contact pad. The antenna may be a PCB based antenna or a ceramic antenna. The coil and the antenna may aid in wireless power transmission. The number of coils, as well as choice of coil vs. antenna, may depend on the required efficiency, coupling mechanisms, power consumption, and transmission distance. FIG. 10 depicts the electrical conductor (1048) as a coil or antenna. The electrical conductor (1048) may be wrapped around an outer perimeter of the pin end (1064). The electrical conductor (1048) of the portable charging/communication interface (1060) may correspond in location with an electrical conductor (1006) of the sensor system (1002). The electrical conductor (1048) may be connected to a power supply (1056), e.g., connected to a portable power supply held within the linear body such as a battery or connected to a power supply via a cord. The electrical conductor (1048) may also be connected to a computing device (1054) while the charging/communication interface interfaces with a sensor system, e.g., via one or more wires, or after the charging/communication interface interfaces with the sensor system, e.g., via a docking station or connection cable.

The power supply (1056) may be a DC power supply, such as a battery, or an AC power supply, such as an outlet. When the portable communication interface (1060) interfaces with the sensor system (1002) (e.g., when the pin end (1064) is inserted into the sensor system (1002) shown in FIG. 10), and the electrical conductor (1048) of the portable charging/communication interface (1060) is within a set distance to the electrical conductor (1006) of the sensor system (1002), the portable charging/communication interface (1060) may interact with the sensor system (1002) by transferring data, charging the sensor system (1002), and/or programming/activating the sensor system (1002). Wireless charging of the sensor system (1002) may be achieved by inductive coupling or magnetic resonance coupling between the electrical conductor (1048) of the portable charging/communication interface (1060) and the corresponding electrical conductor (1006) of the sensor system (1002). Other communication between the portable charging/communication interface (1060) and the sensor system (1002) may be achieved by using high frequency Bluetooth technology.

Figure 11:
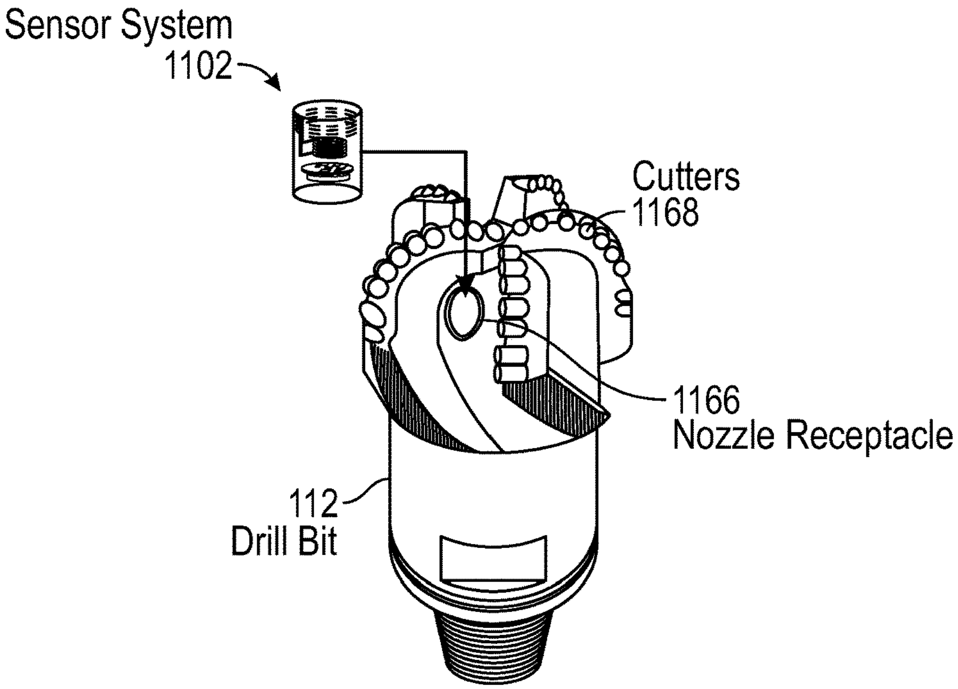
FIG. 11 is a schematic diagram of a sensor system installed in a drill bit nozzle in accordance with one or more embodiments.

FIG. 11 depicts, in one or more embodiments, a sensor system (1102) deployed in a nozzle receptacle (1166) of a drill bit (112). The drill bit (112) may be a roller cone bit, a fixed cutter bit, or a combination bit. A roller cone bit may include one or more rotating disks or cones. A roller cone bit commonly has three cones. The cones may be imbedded with protruding teeth or integrally formed with a plurality of teeth to help break down the rock into smaller pieces. FIG.

11 depicts a fixed cutter bit. A fixed cutter bit may have polycrystalline diamond (PCD) cutters (1168) or other type of ultrahard cutting element disposed along one or more blades of the bit to shear the rock in a continuous scrapping motion. A combination bit may employ aspects of both the roller cone bit and the fixed cutter bit into one apparatus. Although the sensor system (1102) is shown in FIG. 11 as being fitted within a nozzle receptacle (1166) of a fixed cutter bit, sensor systems according to embodiments of the present disclosure may be provided in nozzle receptacles of other downhole cutting tools, such as roller cone bits and combination bits.

A nozzle is a hole or opening which allows for drilling fluid to exit the drill string (108) into the wellbore (102). A nozzle may be installed in a nozzle receptacle (1166) located on the surface of the drill bit (112). The nozzle's opening may be small in order for the exit velocity of the drilling fluid to be high. The high-velocity jet of fluid may clean the teeth of the drill bit (112) and aid in the removal of cuttings from the bottom of the wellbore (102). FIG. 11 depicts a sensor system (1102) being installed into the nozzle receptacle (1166) instead of a nozzle. The sensor system (1102) may be any of the embodiments of sensor systems (1102) disclosed previously. The sensor system (1102) may be threaded into the nozzle receptacle (1166) of the drill bit (112). The sensor system (1102) may also be installed into the nozzle receptacle (1166) by welding, being 3D printed within the drill bit (112), or by any other mechanical fitting. The sensor system (1102) may act as a dummy nozzle, allowing no fluid to pass through, or the sensor system (1102) may act similar to a conventional drill bit (112) nozzle and allow fluid to pass through the sensor system (1102).

Figure 12:
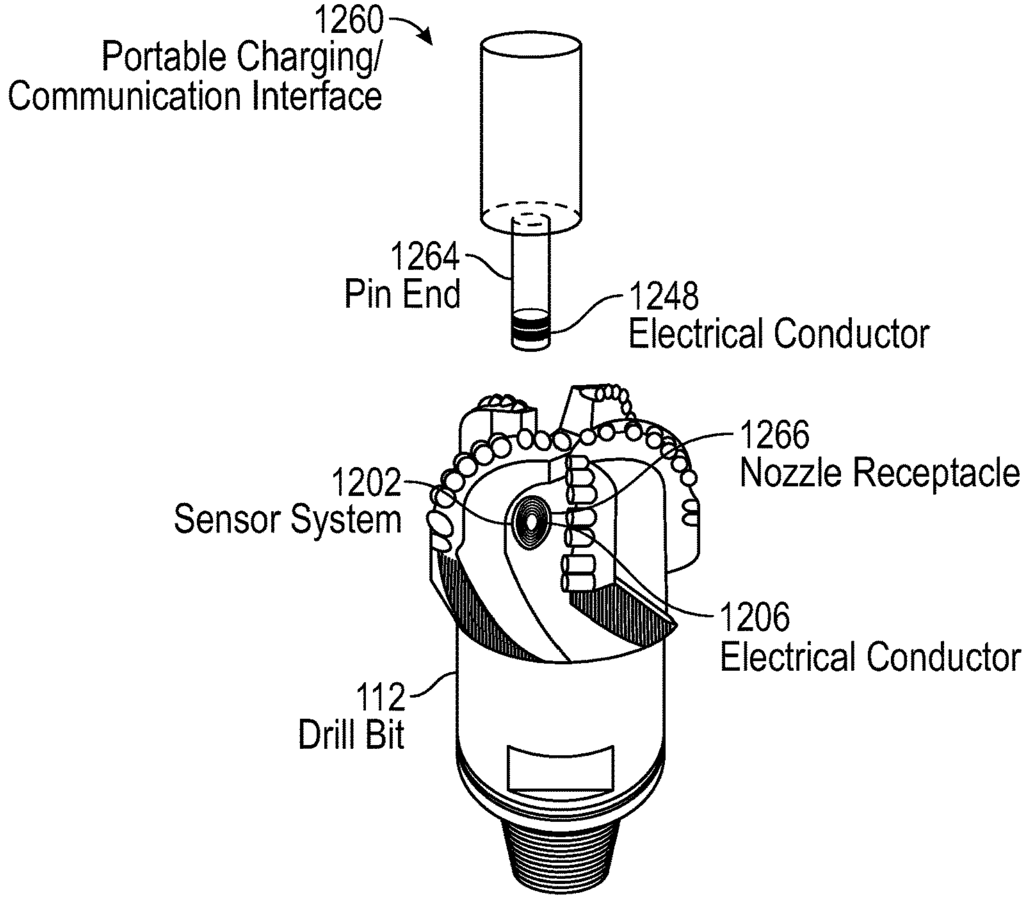
FIG. 12 is a schematic diagram of a charging and communication interface interacting with a sensor system installed in a drill bit in accordance with one or more embodiments.

FIG. 12 depicts, in one or more embodiments, a portable charging/communication interface (1260) being used to interact with the sensor system (1202) while the sensor system (1202) is installed in the nozzle receptacle (1266) of the drill bit (112). The portable charging/communication interface (1260) may have a configuration such as disclosed with respect to FIG. 10 and may be used to interface with a sensor system provided on a fixed cutter drill bit (112); however, other portable charging/communication interfaces in accordance with embodiments of the present disclosure may be used to interface with sensor systems disposed in a nozzle receptacle in a fixed cutter drill bit (112) or other type of downhole cutting tool.

In the embodiment shown, an electrical conductor (1248) may be wrapped around an outer perimeter of a pin end (1264) of the charging/communication interface (1260). The electrical conductor (1248) of the portable charging/communication interface (1260) may correspond in location with the electrical conductor (1206) of the sensor system (1202) when the charging/communication interface interfaces with the sensor system (1202). The charging/communication interface (1260) shown in FIG. 12 may interface with the sensor system (1202) by partially inserting the pin end (1264) into the sensor system housing. When the portable communication interface (1260) is inserted into the sensor system (1202) and the electrical conductor (1248) of the portable charging/communication interface (1260) is within a set distance to the electrical conductor (1206) of the sensor system (1202), the portable charging/communication interface (1260) may interact with the sensor system (1202) by transferring data, charging the sensor system (1202), and/or programming/activating the sensor system (1202).

Figure 13:
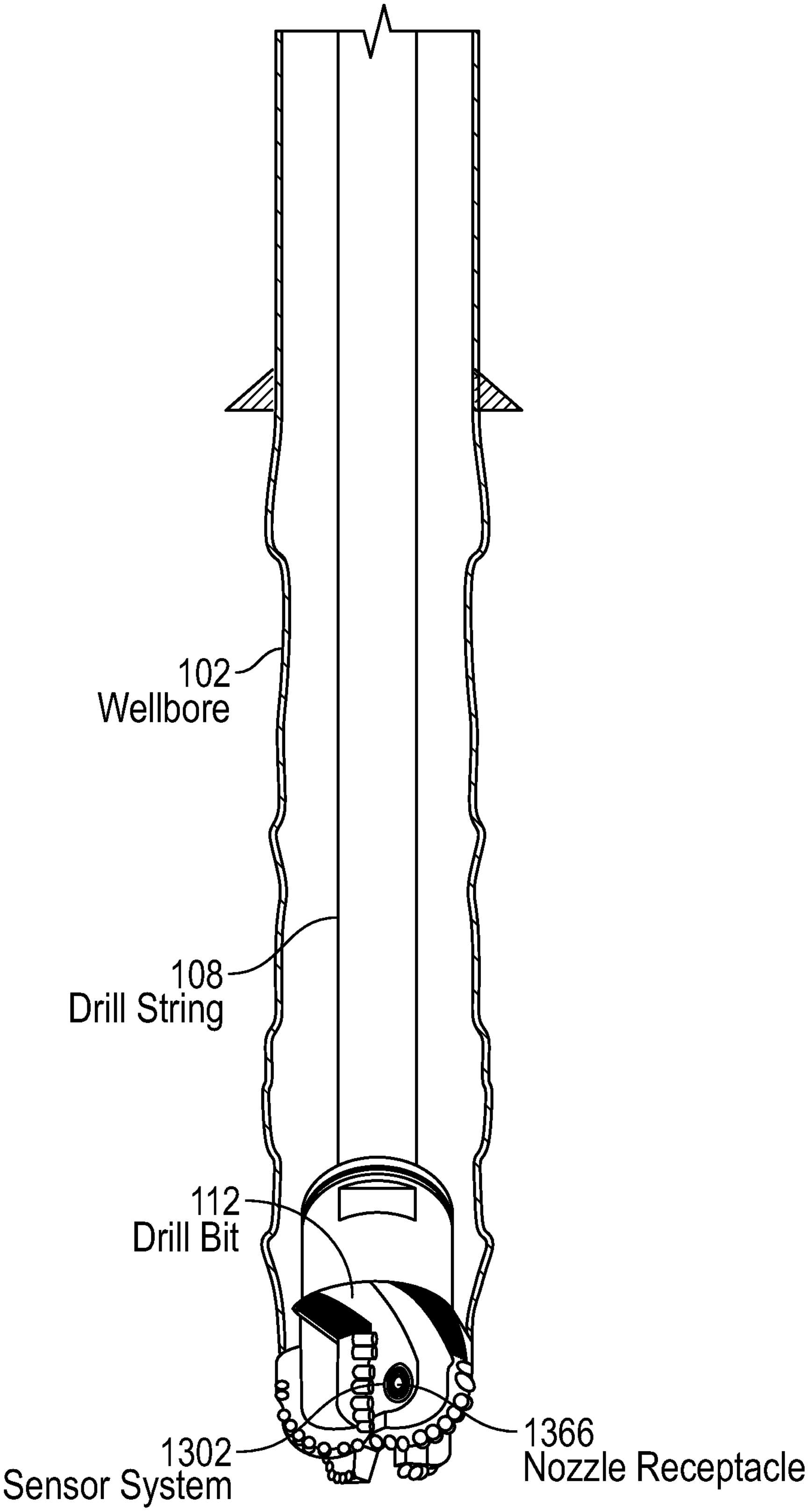
FIG. 13 is a schematic diagram of a sensor system installed in a drill bit deployed on a drill string in a wellbore.

FIG. 13 depicts, in one or more embodiments, a drill bit (112), with a sensor system (1302) installed in a nozzle receptacle (1366), deployed in a wellbore (102). The sensor system (1302) may be any of the embodiments of sensor systems (1302) disclosed previously. The sensor system (1302) may be threaded into the nozzle receptacle (1366) of the drill bit (112) or otherwise retained within the nozzle receptacle (1366) (e.g., using one or more retaining elements blocking the sensory system housing from coming out of the nozzle receptacle). The sensor system (1302) may act as a dummy nozzle, allowing no fluid to pass through, or the sensor system (1302) may act similar to a conventional drill bit (112) nozzle and allow fluid to pass through the sensor system (1302). The drill bit (112) may be a fixed cutter bit, such as depicted in FIG. 13. The drill bit (112) is shown breaking down the rock and extending the wellbore (102) while the sensor system (1302) may simultaneously record drill bit and downhole data. The data may be stored in the sensor system (1302) to be retrieved once the drill bit (112) is on the surface, or the data may be sent to the surface, in real time, by mud pulser telemetry or electromagnetic telemetry, however any method of sending data to the surface may be used without departing from the scope of this disclosure herein.

Figure 14:
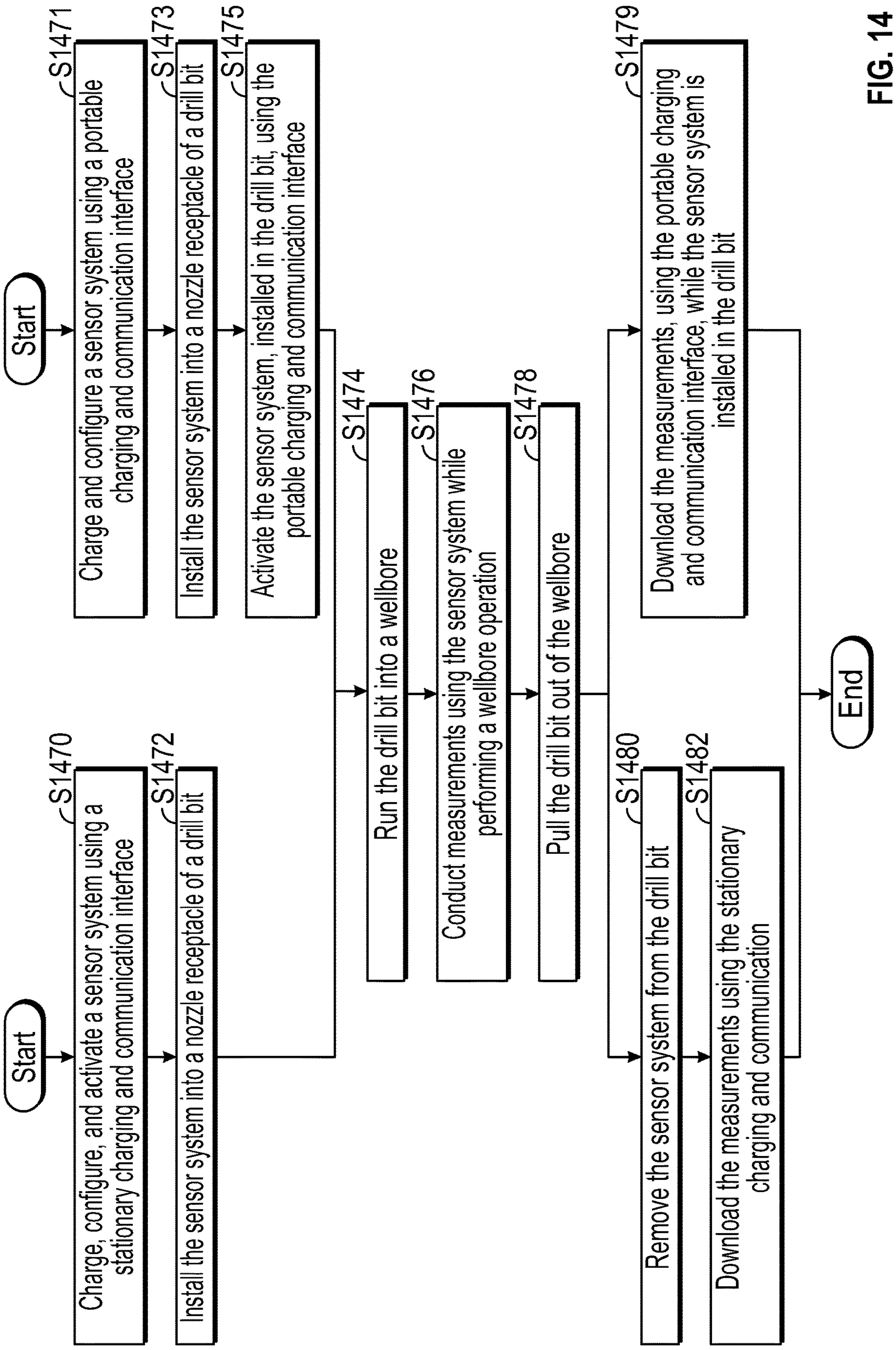
FIG. 14 depicts a flowchart in accordance with one or more embodiments.

FIG. 14 depicts a flowchart depicting the deployment of and interaction between charging/communication interfaces (e.g., 644, 744, 844, 960, 1060, 1260) and sensor systems (e.g., 202, 302, 402, 502, 602, 702, 802, 902, 1002, 1102, 1202, 1302) according to embodiments disclosed herein. In one or more embodiments, a sensor system (e.g., 202, 302, 402, 502, 602, 702, 802, 902, 1002, 1102, 1202, 1302) may be inserted into a slot (e.g., 646, 746, 846) of a stationary charging/communication interface (e.g., 644, 744, 844). An electrical conductor (e.g., 206, 306, 406, 506, 606, 706, 806, 906, 1006, 1206) of the sensor system (e.g., 202, 302, 402, 502, 602, 702, 802, 902, 1002, 1102, 1202, 1302) may come into contact with an electrical conductor (e.g., 648, 748, 848, 948, 1048, 1248) of the stationary charging/communication interface (e.g., 644, 744, 844) in order for the sensor system (e.g., 202, 302, 402, 502, 602, 702, 802, 902, 1002, 1102, 1202, 1302) to be charged, configured and activated (S1470).

The sensor system (e.g., 202, 302, 402, 502, 602, 702, 802, 902, 1002, 1102, 1202, 1302) may be installed into a nozzle receptacle (e.g., 1166, 1266, 1366) of a drill bit (112) (S1472). The drill bit (e.g., 112) may be a roller cone bit, a fixed cutter bit, or a combination bit, for example. The sensor system (e.g., 202, 302, 402, 502, 602, 702, 802, 902, 1002, 1102, 1202, 1302) may be threaded into the nozzle receptacle (1166, 1266, 1366) by an external thread (e.g., 204, 304, 404, 504) located on an external perimeter of the sensor housing (e.g., 214, 314, 414, 514, 614, 714, 814) and an internal thread located on an internal perimeter of the nozzle receptacle (e.g., 1166, 1266, 1366). A wrench groove (e.g., 210, 310, 410, 510) located on one side of the sensor housing (e.g., 214, 314, 414, 514, 614, 714, 814) may be used to thread the sensor system (e.g., 202, 302, 402, 502, 602, 702, 802, 902, 1002, 1102, 1202, 1302) into the nozzle receptacle (e.g., 1166, 1266, 1366).

The drill bit (112) may be attached to a drill string (108) to be run into a wellbore (102) (S1474). The drill bit (112) may perform a wellbore operation such as drilling, where the drill bit (112) may break down the rock of the wellbore (102) with the purpose to extend the wellbore (102). As the drill bit (112) performs the wellbore operation, the sensors (e.g., 216, 316, 416, 516) located within the sensor system (e.g., 202, 302, 402, 502, 602, 702, 802, 902, 1002, 1102, 1202, 1302) may take measurements (S1476). These measurements, or data, may be stored on the PCB (e.g., 208, 308, 408, 508) in order to be retrieved by the stationary charging/communication interface (e.g., 644, 744, 844) at the surface, or the data may be delivered to the surface, in real time, through mud pulser telemetry or electromagnetic telemetry, however any method of sending data to the surface may be used without departing from the scope of this disclosure herein.

The drill bit (112) may be pulled out of the wellbore (102) (S1478) by the drill string (108). The sensor system (e.g., 202, 302, 402, 502, 602, 702, 802, 902, 1002, 1102, 1202, 1302) may be removed from the drill bit (112) (S1480) by unthreading the sensor system (e.g., 202, 302, 402, 502, 602, 702, 802, 902, 1002, 1102, 1202, 1302) from the nozzle receptacle (e.g., 1166, 1266, 1366). The sensor system (e.g., 202, 302, 402, 502, 602, 702, 802, 902, 1002, 1102, 1202, 1302) may be placed into the slot (e.g., 646, 746, 846) of the stationary charging/communication interface (e.g., 644, 744, 844) in order for the measurements, or data, to be downloaded to a computing device (e.g., 654, 754, 854, 954, 1054) (S1482).

In other embodiments, a portable charging/communication interface (e.g., 960, 1060, 1260) may be inserted into a sensor system (e.g., 202, 302, 402, 502, 602, 702, 802, 902, 1002, 1102, 1202, 1302). When an electrical conductor (e.g., 648, 748, 848, 948, 1048, 1248) of the portable charging/communication interface (e.g., 960, 1060, 1260) comes within a set distance of a corresponding electrical conductor (e.g., 206, 306, 406, 506, 606, 706, 806, 906, 1006, 1206) of the sensor system (e.g., 202, 302, 402, 502, 602, 702, 802, 902, 1002, 1102, 1202, 1302) the sensor system (e.g., 202, 302, 402, 502, 602, 702, 802, 902, 1002, 1102, 1202, 1302) may be charged and configured by the portable charging/communication interface (e.g., 960, 1060, 1260) (S1471).

The sensor system (e.g., 202, 302, 402, 502, 602, 702, 802, 902, 1002, 1102, 1202, 1302) may be installed into a nozzle receptacle (e.g., 1166, 1266, 1366) of a drill bit (112) (S1473). The drill bit (112) may be a roller cone bit, a fixed cutter bit, or a combination bit, for example. The sensor system (e.g., 202, 302, 402, 502, 602, 702, 802, 902, 1002, 1102, 1202, 1302) may be threaded into the nozzle receptacle (e.g., 1166, 1266, 1366) by an external thread (e.g., 204, 304, 404, 504) located on an external perimeter of the sensor housing (e.g., 214, 314, 414, 514, 614, 714, 814) and an internal thread located on an internal perimeter of the nozzle receptacle (e.g., 1166, 1266, 1366). A wrench groove (e.g., 210, 310, 410, 510) located on one side of the sensor housing (e.g., 214, 314, 414, 514, 614, 714, 814) may be used to thread the sensor system (e.g., 202, 302, 402, 502, 602, 702, 802, 902, 1002, 1102, 1202, 1302) into the nozzle receptacle (e.g., 1166, 1266, 1366).

The portable charging/communication interface (e.g., 960, 1060, 1260) may be inserted into the sensor system (e.g., 202, 302, 402, 502, 602, 702, 802, 902, 1002, 1102, 1202, 1302) while the sensor system (e.g., 202, 302, 402, 502, 602, 702, 802, 902, 1002, 1102, 1202, 1302) is installed in the drill bit (112), in order for the sensor system (e.g., 202, 302, 402, 502, 602, 702, 802, 902, 1002, 1102, 1202, 1302) to be activated (S1475). The drill bit (112) may be attached to a drill string (108) to be run into a wellbore (102) (S1474). The drill bit (112) may perform a wellbore operation such as drilling, where the drill bit (112) may break down the rock of the wellbore (102) with the purpose to extend the wellbore (102).

As the drill bit (112) performs the wellbore (102) operation, the sensors (e.g., 216, 316, 416, 516) located within the sensor system (e.g., 202, 302, 402, 502, 602, 702, 802, 902, 1002, 1102, 1202, 1302) may take measurements (S1476). These measurements, or data, may be stored on the PCB (e.g., 208, 308, 408, 508) in order to be retrieved by the portable charging/communication interface (e.g., 960, 1060, 1260) at the surface, or the data may be delivered to the surface, in real time, through mud pulser telemetry or electromagnetic telemetry, however any method of sending data to the surface may be used without departing from the scope of this disclosure herein.

The drill bit (112) may be pulled out of the wellbore (102) (S1478) by the drill string (108). The portable charging/communication interface (e.g., 960, 1060, 1260) may be inserted into the sensor system (e.g., 202, 302, 402, 502, 602, 702, 802, 902, 1002, 1102, 1202, 1302) while the sensor system (e.g., 202, 302, 402, 502, 602, 702, 802, 902, 1002, 1102, 1202, 1302) is installed in the drill bit (112) in order for the measurements, or data, to be downloaded from the sensor system (e.g., 202, 302, 402, 502, 602, 702, 802, 902, 1002, 1102, 1202, 1302) to a computing device (e.g., 654, 754, 854, 954, 1054) (S1479).

Sensor systems according to embodiments of the present disclosure may include one or more sensors for taking different downhole measurements and electronic components to support the sensor(s), such as a PCB, a memory component, a microprocessor, powering unit, and communication module. Software instructions for the sensor(s), including, for example, how often to take a measurement, where to store and/or transmit measurements, may be stored in a memory component and may be executed by the microprocessor. Software instructions may be uploaded and/or updated using charging/communication interfaces according to embodiments of the present disclosure. Additionally, or alternatively, measurement data may be transferred from a sensor system to a charging/communication interface. Communication between sensor systems according to embodiments of the present disclosure and charging/communication interfaces of the present disclosure may be done wirelessly (e.g., through electric conductors of the sensor system and charging/communication interfaces positioned proximate to each other but separated by a non-metallic element) or through direct contact between contact pads in the sensor system and charging/communication interface. Further, charging/communication interfaces according to embodiments of the present disclosure may be used to charge a sensor system, e.g., wirelessly or through direct electric contact.

Using sensor systems of the present disclosure may allow for downhole measurements to be taken at the bit during drilling operations using pre-exiting nozzle receptacles, or using receptacles formed in the bit to receive sensor systems. Sensor systems disclosed herein may also be configured to allow fluid to flow through the bit while taking measurements by providing a fluid flow path through the sensor system housing.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A device comprising:

a stationary platform comprising an upper surface;

at least one slot extending a depth from the upper surface into the stationary platform;

a sensor system configured to be inserted into a nozzle of a drill bit to obtain data and configured to be removed from the nozzle of the drill bit to be placed into the at least one slot in the stationary platform; and an electrical conductor connected to the at least one slot, wherein the electrical conductor is connected to at least one power supply and at least one computing device and the electrical conductor is configured to transmit the data from the sensor system to the at least one computing device and transmit power from the at least one power supply to the sensor system.

2. The device of claim 1, wherein the electrical conductor further comprises at least one of a coil, an antenna, and a contact pad.

3. The device of claim 1, wherein the electrical conductor is installed on a bottom surface of the at least one slot and the electrical conductor corresponds with an electrical conductor on the sensor system.

4. The device of claim 1, wherein the at least one coil is wrapped around a side surface in a middle section of the at least one slot, wherein the middle section is located axially along the depth of the slot, between a bottom surface of the slot and the upper surface of the stationary platform.

5. The device of claim 1, wherein the device further comprises:

a pin extending a height from a bottom surface of the at least one slot, wherein the height of the pin is less than the depth of the slot;

wherein the electrical conductor is wrapped around an outer perimeter of the pin.

6. A device comprising:

a sensor system having a flow path and configured to be inserted into a nozzle of a drill bit to obtain data;

a portable linear body comprising a pin end, wherein the pin end is configured to be inserted into a cavity of the sensor system;

an electrical conductor connected to the pin end, the electrical conductor comprising at least one coil; and at least one power supply and at least one computing device in communication with the electrical conductor, wherein the electrical conductor is configured to transmit the data from the sensor system to the at least one computing device and transmit power from the at least one power supply to the sensor system.

7. The device of claim 6, wherein the at least one coil is installed on a bottom surface of the pin end.

8. The device of claim 6, wherein the at least one coil is wrapped around an outer perimeter of the pin end.

* * * * *